United States Patent
Toyoshima et al.

(10) Patent No.: US 10,291,611 B2
(45) Date of Patent: May 14, 2019

(54) CONFIDENTIAL INFORMATION STORING METHOD, INFORMATION PROCESSING TERMINAL, AND COMPUTER-READABLE RECORDING MEDIUM

(71) Applicant: FUJITSU LIMITED, Kawasaki-shi, Kanagawa (JP)

(72) Inventors: Koji Toyoshima, Shiroi (JP); Takashi Shinzaki, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 15/340,443

(22) Filed: Nov. 1, 2016

(65) Prior Publication Data
US 2017/0142102 A1  May 18, 2017

(30) Foreign Application Priority Data

Nov. 16, 2015  (JP) .................................. 2015-223986

(51) Int. Cl.
*G06F 21/00* (2013.01)
*H04L 29/06* (2006.01)
(Continued)

(52) U.S. Cl.
CPC ...... *H04L 63/0861* (2013.01); *G06F 12/1408* (2013.01); *G06F 21/32* (2013.01); *H04L 63/0428* (2013.01); *G06F 2212/1052* (2013.01)

(58) Field of Classification Search
None
See application file for complete search history.

(56) References Cited

U.S. PATENT DOCUMENTS 6,594,376 B2 * 7/2003 Hoffman ............... G06K 9/6255
382/115
6,957,337 B1 * 10/2005 Chainer ................. G06F 21/32
713/186
(Continued)

FOREIGN PATENT DOCUMENTS

JP   2002-189702   7/2002
JP   2007-018050   1/2007
(Continued)

OTHER PUBLICATIONS

Suzuki, Hiroyuki et al. Encrypted sensing for enhancing security of biometric authentication. 2014 13th Workshop on Information Optics (WIO). https://ieeexplore.ieee.org/stamp/stamp.jsp?tp=&arnumber=6933292 (Year: 2014).*

(Continued)

*Primary Examiner* — Jeremiah L Avery
(74) *Attorney, Agent, or Firm* — Fujitsu Patent Center

(57) ABSTRACT

A confidential information storing method performed by a computer is disclosed. Multiple sets of biometric information are acquired from a biometric information reader. The multiple sets of the acquired biometric information and specific information for specifying the biometric information to be used to generate a pass phrase are stored in a biometric information storage part. The pass phrase generated based on the biometric information and the specific information are acquired. Confidential information is encrypted by using the acquired pass phrase. The encrypted confidential information is stored.

11 Claims, 21 Drawing Sheets

(51) Int. Cl.
*G06F 12/14* (2006.01)
*G06F 21/32* (2013.01)

(56) References Cited

U.S. PATENT DOCUMENTS

| | | | | |
|---|---|---|---|---|
| 7,773,784 | B2* | 8/2010 | Boult | G06K 9/00885 |
| | | | | 380/277 |
| 7,882,032 | B1* | 2/2011 | Hoffman | G06F 21/6218 |
| | | | | 705/50 |
| 7,886,156 | B2* | 2/2011 | Franchi | G06F 21/32 |
| | | | | 713/186 |
| 7,961,917 | B2* | 6/2011 | Black | G06F 3/03545 |
| | | | | 382/116 |
| 7,984,303 | B1* | 7/2011 | Ma | G06F 21/32 |
| | | | | 713/182 |
| 8,339,240 | B2* | 12/2012 | Aikawa | G06Q 20/341 |
| | | | | 283/69 |
| 8,708,230 | B2* | 4/2014 | Cannon | G06K 7/0008 |
| | | | | 235/380 |
| 9,852,279 | B2* | 12/2017 | Shim | G06F 21/6245 |
| 2002/0073213 | A1 | 6/2002 | Mekata et al. | |
| 2007/0011466 | A1 | 1/2007 | Imura | |
| 2012/0303966 | A1* | 11/2012 | Hubner | G06Q 20/40145 |
| | | | | 713/186 |
| 2013/0254533 | A1* | 9/2013 | Welch | G06F 21/32 |
| | | | | 713/155 |
| 2015/0067348 | A1* | 3/2015 | Webber | G06F 21/32 |
| | | | | 713/186 |
| 2017/0249471 | A1 | 8/2017 | Bond | |

FOREIGN PATENT DOCUMENTS

| | | |
|---|---|---|
| JP | 2009-93420 | 4/2009 |
| JP | 2010-287051 | 12/2010 |
| JP | 2011-519102 A | 6/2011 |
| JP | 2012-022507 | 2/2012 |

OTHER PUBLICATIONS

Noto, Sandro et al. Analysis of Error Correcting Codes for the Secure Storage of Biometric Templates. 2011 IEEE EUROCON—International Conference on Computer as a Tool. https://ieeexplore.ieee.org/stamp/stamp.jsp?tp=&arnumber=5929223 (Year: 2011).*

Lakhera, Manmohan. Enhancing Security of Stored Biometric Data. 2014 Innovative Applications of Computational Intelligence on Power, Energy and Controls with their impact on Humanity (CIPECH). https://ieeexplore.ieee.org/stamp/stamp.jsp?tp=&arnumber=7019043 (Year: 2014).*

Japanese Office Action dated Mar. 12, 2019 for corresponding Japanese Patent Application No. 2015-223986, with English Translation, 7 pages.

* cited by examiner

FIG.5

| BIOMETRIC INFORMATION REGISTRATION ID (12 DIGITS) | CUSTOMER ID (12 DIGITS) | BIOMETRIC TYPE (2 DIGITS) | BIOMETRIC INFORMATION (BINARY) | |
|---|---|---|---|---|
| 000000000001 | 000000000001 | 00 | PALM VEIN INFORMATION (1ST TIME) | BIOMETRIC INFORMATION FOR GENERATING PASS PHRASE |
| 000000000002 | 000000000001 | 01 | PALM VEIN INFORMATION (1ST TIME) | |
| 000000000003 | 000000000001 | 01 | PALM VEIN INFORMATION (2ND TIME) | |
| 000000000004 | 000000000004 | 00 | PALM VEIN INFORMATION (1ST TIME) | BIOMETRIC INFORMATION FOR GENERATING PASS PHRASE |
| 000000000005 | 000000000004 | 01 | PALM VEIN INFORMATION (1ST TIME) | |
| 000000000006 | 000000000004 | 01 | PALM VEIN INFORMATION (2ND TIME) | |
| 000000000007 | 000000000004 | 02 | FACE IMAGE (1ST TIME) | |
| 000000000008 | 000000000004 | 02 | FACE IMAGE (2ND TIME) | |
| 000000000009 | 000000000004 | 03 | FINGERPRINT INFORMATION (1ST TIME) | |
| 000000000010 | 000000000004 | 03 | FINGERPRINT INFORMATION (2ND TIME) | |
| .. | .. | .. | .. | |

350

USER A: rows 1–3
USER B: rows 4–10

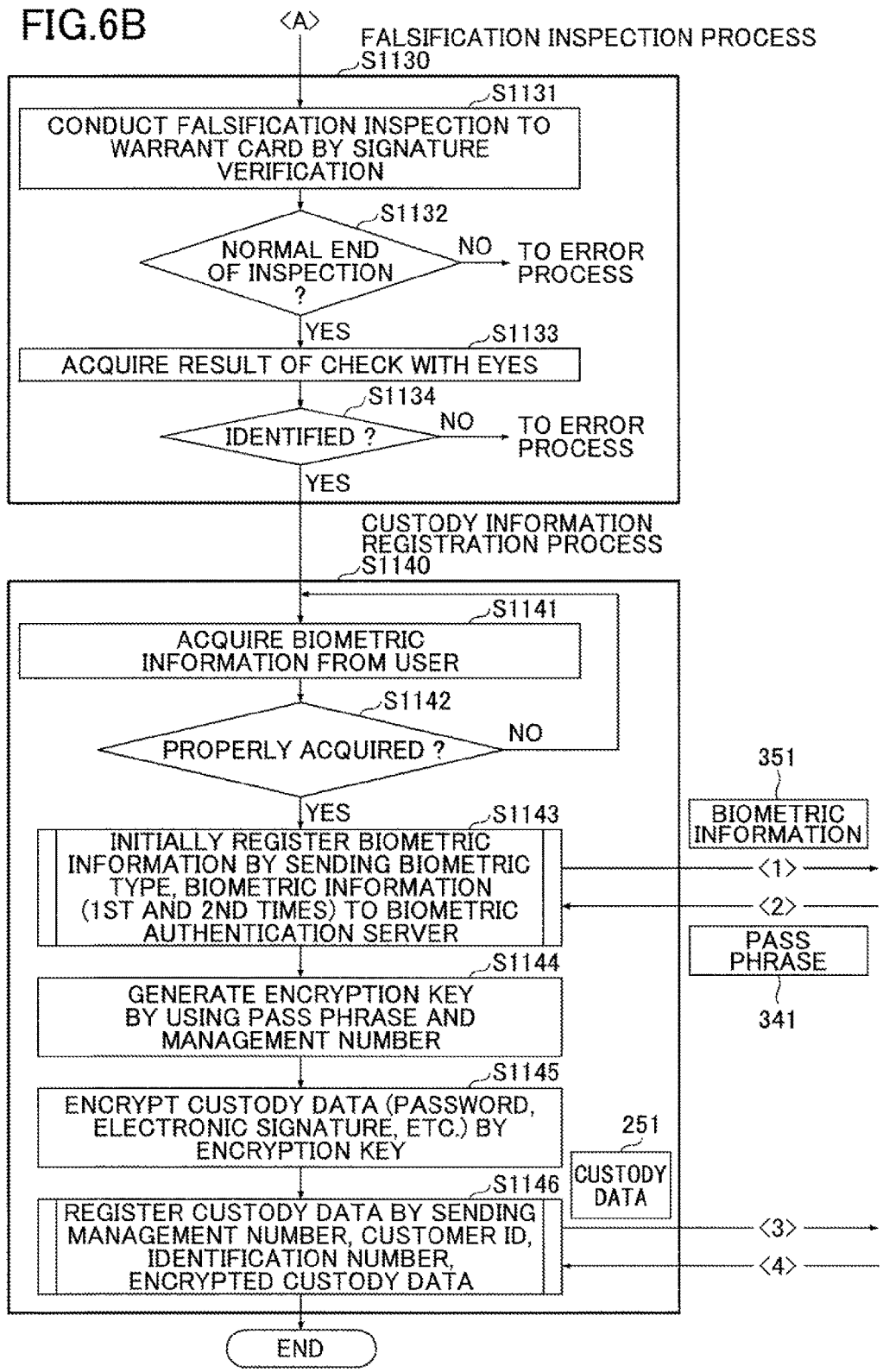

CONFIDENTIAL INFORMATION STORING METHOD, INFORMATION PROCESSING TERMINAL, AND COMPUTER-READABLE RECORDING MEDIUM

CROSS-REFERENCE TO RELATED APPLICATIONS

This application is based upon and claims the benefit of priority of the prior Japanese Patent Application No. 2015-223986, filed on Nov. 16, 2015, the entire contents of which are incorporated herein by reference.

FIELD

The embodiments discussed herein are related to a confidential information storing method, an information processing terminal, and a computer-readable recording medium having stored therein a confidential information storing program.

BACKGROUND

To cope with recent crime of identity theft, an official identification, to which an IC chip including an electronic signature is mounted, such as an IC passport, an IC driver's license, and the like has been recommended to use.

For this official identification, when data of the IC chip is read out, an IC authentication is performed by a password such as a PIN (Personal Identification Number) code or the like. When the user forgets this password, the user is not allowed to access the IC chip. Hence, an authenticity determination using the electronic signature, that is, an IC authentication is not conducted.

Therefore, various technologies are presented. In one technology, a portable medium is prepared to record medium identification information for identifying the medium itself other than an authentication IC card being the official identification, and the medium identification information is stored by associating it with the password. In another technology, an IC authentication is used by using the password being associated with biometric information. In a further technology, the password is encrypted by using biometric information.

PATENT DOCUMENTS

[Patent Document 1] Japanese Patent No. 5315137
[Patent Document 2] Japanese Patent No. 5439306
[Patent Document 3] Japanese Laid-open Patent Publication No. 2007-18050

SUMMARY

According to one aspect of the embodiments, there is provided a confidential information storing method performed by a computer, including: acquiring multiple sets of biometric information from a biometric information reader; storing the multiple sets of the acquired biometric information and specific information for specifying the biometric information to be used to generate a pass phrase in a biometric information storage part; acquiring the pass phrase generated based on the biometric information and the specific information; encrypting confidential information by using the acquired pass phrase; and storing the encrypted confidential information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data structure of a biometric information DB;
FIG. 6A, FIG. 6B, FIG. 6C, and FIG. 6D are diagrams illustrating a process sequence for explaining a new registration process in the system.

DESCRIPTION OF EMBODIMENTS

Figure 1:
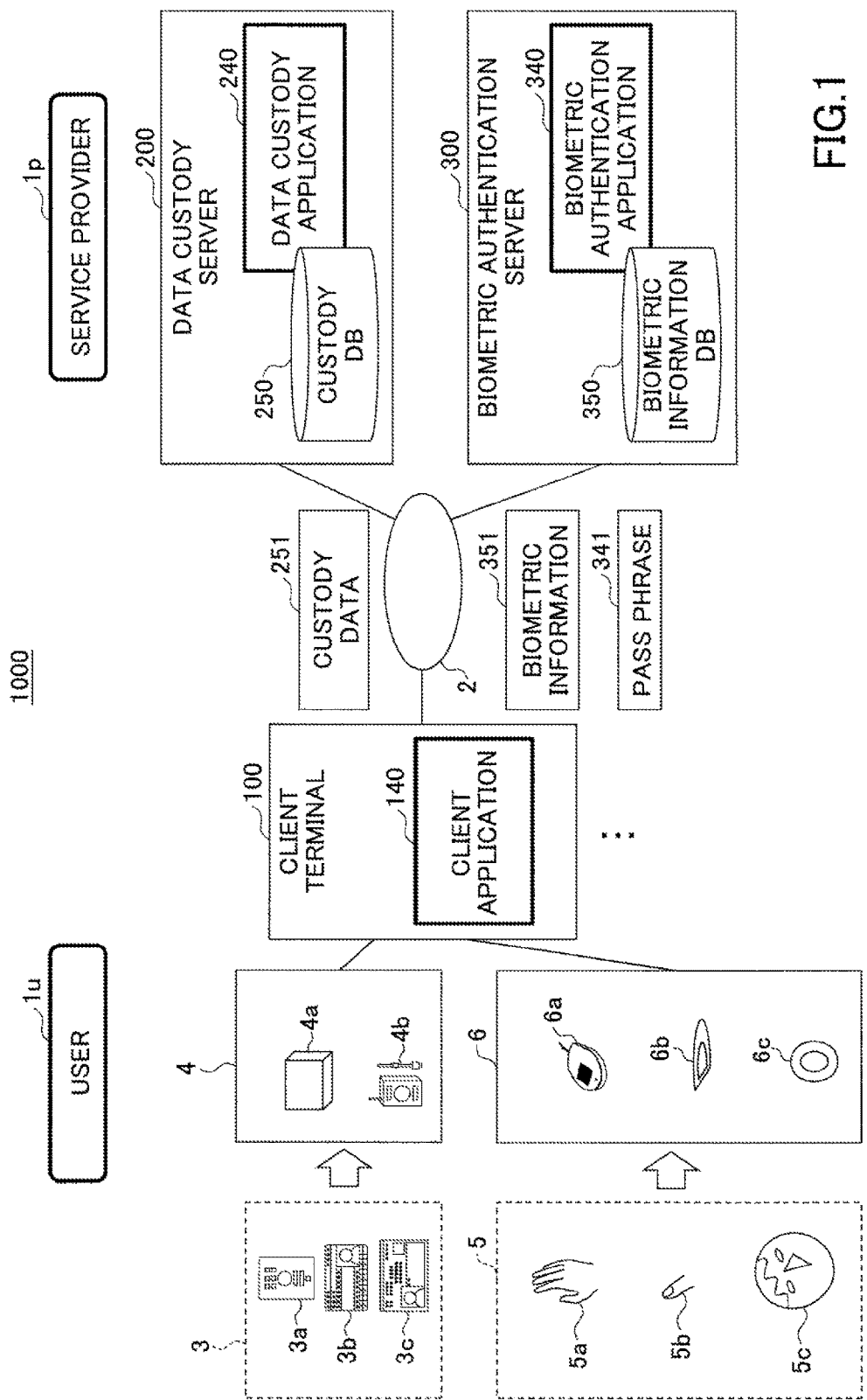
FIG. 1 is a diagram illustrating an example of a system configuration.

In related art such as a technology described above, in which an IC authentication is conducted by using a portable recording medium storing medium identification information, disadvantageously, it is demanded the user always carries multiple cards with him/her in order to maintain a portable medium for each of official identifications.

It is considered that confidential information pertinent to the IC authentication is stored and protected by biometric authentication. In the IC authentication, in a case in which the same biometric information is not generated due to dispersion of inputs of the biometric information by a user or the like or the like, the user may input the biometric information, again. Such retry by multiple inputs is an inconvenience for the user.

In the following, preferred embodiments of the present invention will be described with reference to the accompanying drawings.

In practice, in a case in which a deposit and saving account is opened, a contract is settled for a mobile phone, an entry and exit card for a facility is issued, or the like, individual identification is always conducted at a counter. A basic premise of the individual identification is that a user presents the official identification such as a driver's license for an identity confirmation at the counter, a person in charge at the counter checks with eyes the user and the official identification. However, there are cases in which it is difficult for the check of eyes to detect an identification being cleverly disguised, an identification in that a social position or a qualification is disguised, or the like.

Also, if the deposit and saving account and the mobile phone being illegally acquired are used for a crime infrastructure such as an organized crime, a scam, a theft, a cybercrime, or the like, even the check of eyes is not conducted. Hence, it has become a serious threat to security.

In a case of the official identification being formed into an IC chip and protected by the password, an authenticity determination (which may be also called "IC authentication") is performed with a signature verification (including a certificate verification) by using a Public-Key Infrastructure (PKI) technology with respect to the electronic signature recorded in the IC chip. The official identification may be called "authentication IC card".

However, when the user forgets the password, the IC authentication is not performed. The patent document 1 provides a technology in that a portable medium recording medium identification information uniquely defined is prepared, and the medium identification information identifies the medium itself other than the authentication IC card used for an authentication using the password. The password is retained by associating it with the medium identification information being stored in the portable medium.

In this related art, the IC authentication is performed without inputting the password, and data in the IC chip are read out. Accordingly, for use of the authentication IC card, this technology corresponds to user's forgetting the password. On the other hand, another portable medium other than the authentication IC card is used. The user is demanded to always possess multiple cards.

Instead of possessing the portable media other than the authentication IC card, use of biometric information may be considered.

The patent document 2 presents that free data corresponding to an identification stored in an IC medium is associated with the biometric information, and the biometric information and the password are associated with each other and are stored in a database.

In the patent document 2, a biometric authentication is conducted with the biometric information corresponding to the free data (ID). When the biometric authentication is successfully conducted, the password associated with the biometric information is acquired from the database, and is used for the IC authentication.

In the patent document 3, when the password of the authentication IC card is registered, an encryption key is generated by the biometric information of the user possessing the authentication IC card, and the password is encrypted and stored. When the password is used, the encryption key is generated by the biometric information, and the password is decrypted. By using the decrypted password, an access to the authentication IC card is allowed.

However, in a technology for maintaining the password by using the biometric information, due to dispersion of inputs of the biometric information by the user, fluctuation of the biometric information being input occurs. It is difficult to generate the same biometric information every time. Accordingly, an input retry of the biometric information by the user is likely to be incurred.

Accordingly, as for a uniqueness of the biometric information for an input dispersion of the biometric information, the embodiment provides a confidential information storing method, an information processing terminal, and a computer-readable recording medium having stored therein a confidential information storing program, in which confidential information such as a password is safely and securely recorded and maintained without relying on a user's memory.

In the embodiment, an encryption key is generated by using a pass phrase generated from the biometric information and a management number (which may be a driver's license number or the like), the confidential information such as the password or the like is registered to a database of a data center or the like. Under a safe and secure storage maintenance is realized, the confidential information is recorded.

In a case of the above described related arts, the biometric information itself is used to generate the encryption key. However, the biometric information is dispersed every time the biometric information is acquired. It is difficult to realize the uniqueness of the biometric information by the related arts due to the dispersion.

In the embodiment, the biometric information is always detected uniquely from multiple sets of biometric information of the same person. In addition, the pass phrase is generated based on different biometric information for each of individuals. Hence, it is possible to improve randomization of the pass phrase regardless of security knowledge of the user.

First, a system 1000 according to the embodiment will be described with reference to FIG. 1. FIG. 1 is a diagram illustrating an example of a system configuration. In FIG. 1, the system 1000 includes a client terminal 100 for a user 1u, and includes a data custody server 200 and a biometric authentication server 300 at a service provider 1p. The system 1000 may be installed into various businesses, which examine the user 1u by referring to official identification at counters of the government, an airport, financial affairs, and the like.

The client terminal 100 and the data custody server 200 are connected through a network 2, and the client terminal 100 and the biometric authentication server 300 are connected through the network 2.

The client terminal 100 is used by the user 1u, and includes a client application 140 for conducting a process pertinent to the identity confirmation that collates the user 1u with a person indicated by an authentication IC card 3. The client terminal 100 internally or externally includes at least one type of a card reader 4, and at least one type of a biometric information reader 6.

The card reader 4 may be capable of reading one or more types of various authentication IC cards 3. The card reader 4 includes one or more of an easy scanner 4a, an IC card reader 4b, and the like. The authentication IC card 3 is a card with an IC chip mounted, to which the electronic signature is applied, and may be one of a passport 3a, a driver's license 3b, a personal number card 3c, and the like.

Custody data 251 includes at least the confidential information, which is related to an access to information recorded in the authentication IC card 3 and is encrypted. The encrypted confidential information is not limited to information, which is decrypted and is allowed to be read out when the authentication using the password is successful, and may be the password. The password is encrypted and recorded by using a one-way function, which is impossible to be decrypted, generally not to be read. Accordingly, the password entered by the user 1u may be temporarily stored, and the authentication IC card may conduct the authentication by using the password. When the IC authentication is successful, the password being stored may be used. In the embodiment, the password corresponds an example of the custody data 251.

The biometric information reader 6 is used to read a body part 5 of the user 1u. The biometric information reader 6 serves as one or more types of a vein sensor 6a, a fingerprint sensor 6b, a camera 6c, and the like.

The body part 5 may include a palm 5a of the user 1u, a finger 5b of the user 1u, a face 5c of the user 1u, and the like.

In a case of the palm 5a, palm veins are read by the vein sensor 6a. In a case of the finger 5b, the fingerprint of the finger 5b is read by the fingerprint sensor 6b. In a case of the face 5c, a face picture is taken by the camera 6c.

Biometric information 351 corresponds to information pertinent to the body part 5 of the user 1u acquired by one of the vein sensor 6a, the fingerprint sensor 6b, the camera 6c, and the like.

The client application 140 realizes a process at the client terminal 100 by various programmed processes. In the embodiment, the client application 140 realizes a biometric authentication, which is convenient for the user 1u, by associating it with the biometric authentication server 300, and corresponds to a process part for performing processes such as a registration, a reference, an update, and the like of the custody data 251 in the data custody server 200.

In the registration of the custody data 251, the client application 140 registers multiple sets of biometric information 351 in the biometric authentication server 300. After acquiring a pass phrase 341, which is generated from the biometric information 351 and is related to a uniqueness of the biometric information 351, from the biometric authentication server 300, by encrypting the custody data 251 by the encryption key generated by using at least the pass phrase 341, the custody data 251 is recorded and registered in a custody DB 250 of the data custody server 200.

In a case of referring to the custody data 251 after the registration, the client application 140 receives the custody data 251 during communications with the data custody server 200, and instructs the biometric authentication server 300 to conduct the biometric authentication using the biometric information 351 in the embodiment.

When the biometric authentication is successful, the client application 140 receives from the biometric authentication server 300 the password, which is registered by decrypting the custody data 251 by the encryption key generated by using at least the received pass phrase 341, and conducts the IC authentication by using the password in the IC chip, which is acquired by accessing the authentication IC card 3.

When the IC authentication is successful, the client application 140 reads out and displays the face picture recorded in a warrant card (that is, the IC chip). The user 1u is checked with the displayed face picture with eyes. Even if the IC authentication is successful, it is preferable to verify falsification of the warrant card by checking an electronic signature or the like.

After the registration, the custody data 251 is updated when the password or the like is changed. After the IC authentication and the check with eyes, the client application 140 generates the encryption key by using at least the pass phrase 341, which is acquired from the biometric authentication server 300 at the biometric authentication, encrypts the custody data 251 including a changed password and the like by the generated encryption key, and sends the custody data 251 to the data custody server 200. The custody data 251 of the user 1u is updated in the custody DB 250 of the data custody server 200.

The data custody server 200 corresponds to a data center or the like maintained by the service provider 1p, and provides service for receiving and securely and safely retaining the received data. The data custody server 200 mainly includes a data custody application 240 and the custody DB 250.

The data custody application 240 realizes, by an application program, the service provided by the data custody server 200. In the embodiment, the data custody application 240 conducts various processes for registering the custody data 251 in the custody DB 250, for referring to the custody data 251 being registered, and the like in response to respective requests from the client terminal 100.

The custody DB250 is regarded as a database that records and retains the confidential information making possible to access a corresponding authentication IC card 3, as the custody data 251. Since the custody data 251 are recorded in the custody DB 250 in a state of being encrypted at the client terminal 100, the custody data 251 is securely retained.

The biometric authentication server 300 is maintained by the service provider 1p who is the same as or different from that of the data custody server 200, and conducts the biometric authentication according to the embodiment. The biometric authentication server 300 mainly includes a biometric authentication application 340 and a biometric information DB 350.

The biometric authentication application 340 realizes, by an application program, the service provided by the biometric authentication server 300. In the embodiment, the biometric authentication application 340 conducts processes for registering the biometric information 351 in the biometric information DB 350, for the biometric authentication by using the registered biometric information 351, for updating (re-registering) the registered biometric information 351 in response to various requests from the client terminal 100.

The biometric information DB 350 is used to record and maintain two or more sets of the biometric information 351 with respect to at least one body part 5 for each of the users 1u.

When the biometric information 351 is registered, the biometric authentication application 340 receives two or more sets of the biometric information 351 with respect to the same body part 5 of the user 1u, generates the pass phrase 341 by using one set of the biometric information 351, and sends the generated pass phrase 341 to the client terminal 100. The biometric authentication application 340 records two or more sets of the received biometric information 351 in the biometric information DB 350, and also records the generated pass phrase 341.

For the biometric authentication, the biometric authentication application 340 matches the received biometric information 351 for the authentication with each of multiple sets of the biometric information 351, of which the body parts 5 are the same as the body part 5 of the received biometric information 351 (1:N collation).

The biometric authentication application 340 selects the biometric information 351, for which the pass phrase 341 is generated at the registration, from two or more sets of the biometric information 351, which have been registered for the user 1u of the biometric information 351 being collated in the biometric information DB 350, generates the pass phrase 341 again by using the selected biometric information 351, and sends the generated pass phrase 341 to the client terminal 100.

For the update (the re-registration) and the addition of the biometric information 351, the biometric authentication application 340 matches the received biometric information 351 for the authentication with each of multiple sets of the biometric information 351, of which the body parts 5 are the same as the body part 5 of the received biometric information 351 (1:N collation).

At the client terminal 100, when a collation result indicates that the user 1u is successfully identified, the biometric authentication server 300 sends the biometric information 351 of the user 1u to re-register or add.

The biometric authentication server 300 receives two or more sets of the biometric information 351 of the user 1u to re-register. When the body parts 5 of two or more sets of the received biometric information 351 are the same as that of the two or more sets of the registered biometric information 351, the biometric authentication server 300 replaces the registered biometric information 351 with the received biometric information 351.

When the received biometric information 351 is different from the registered biometric information 351, the biometric information 351 may be added. The biometric authentication server 300 adds the received biometric information 351 in addition to the registered biometric information 351 for the user 1u.

In FIG. 1, the service provider 1p includes the data custody server 200 and the biometric authentication server 300. The data custody server 200 and the biometric authentication server 300 may be realized by one server. In this case, the data custody application 240 and biometric authentication application 340 are installed into the one server. The one server maintains the biometric information 351 by the custody DB 250 and the biometric information DB 350.

Figure 2:
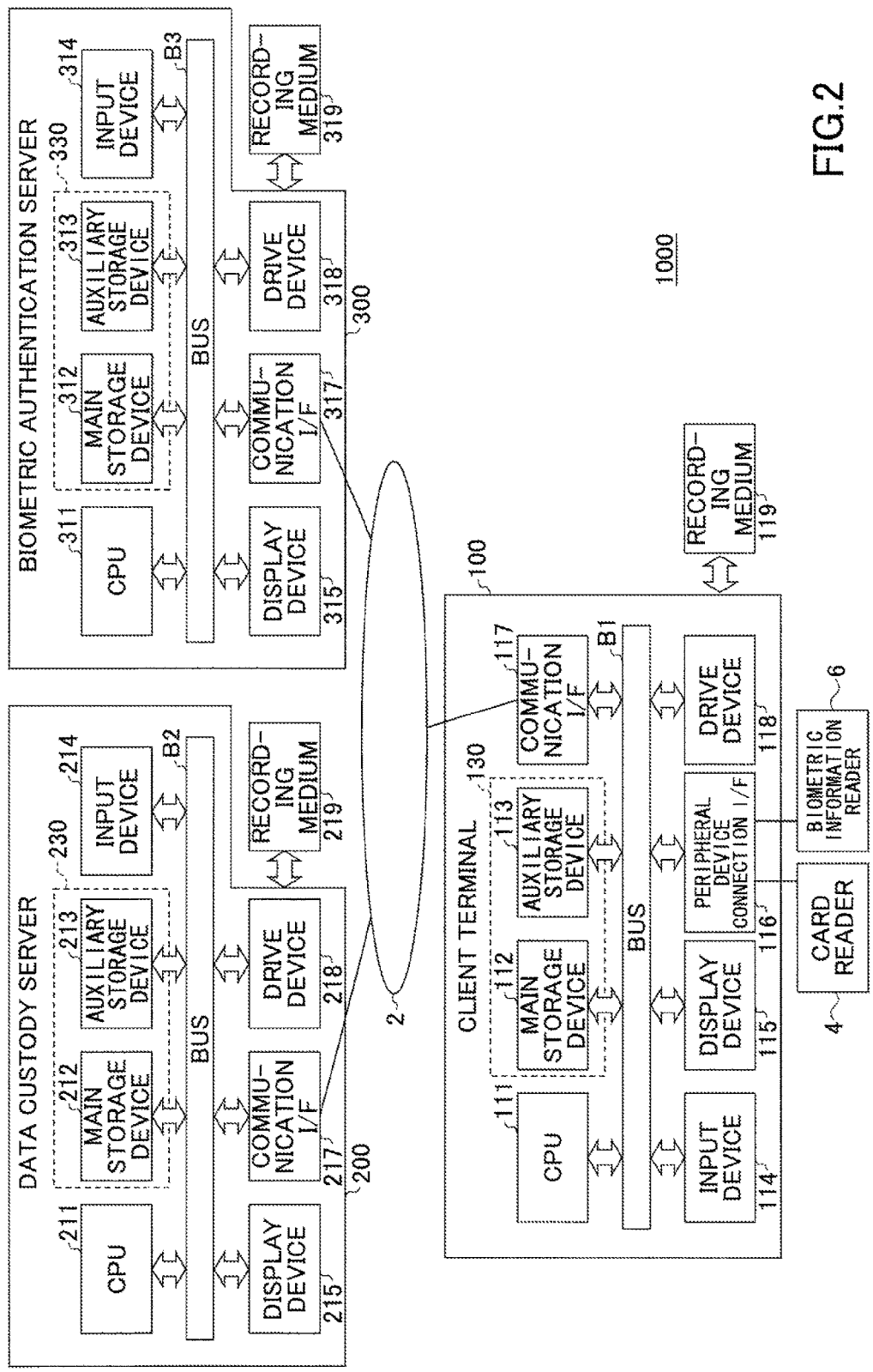
FIG. 2 is a diagram illustrating a hardware configuration in a system.

Next, hardware configurations of the client terminal 100, the data custody server 200, and the biometric authentication server 300 will be described. FIG. 2 is a diagram illustrating a hardware configuration in the system.

In FIG. 2, the client terminal 100 is regarded as an information processing apparatus controlled by a computer, and includes a Central Processing Unit (CPU) 111, a main storage device 112, an auxiliary storage device 113, an input device 114, a display device 115, a peripheral device connection InterFace (I/F) 116, a communication I/F 117 and a drive device 118, which are connected via a bus B1.

The CPU 111 corresponds to a processor that controls the client terminal 100 in accordance with a program stored in the main storage device 112. As the main storage device 112, a Random Access Memory (RAM), a Read Only Memory (ROM), and the like are may be used to store or temporarily store the program executed by the CPU 111, data used in a process by the CPU 111, data acquired in the process by the CPU 111, and the like.

A Hard Disk Drive (HDD) or the like is used as the auxiliary storage device 113, and stores data such as the program. A part of the program stored in the auxiliary storage device 113 is loaded into the main storage device 112, and is executed by the CPU 111, so that various processes are realized. A storage part 130 corresponds to the main auxiliary device 112 and/or the auxiliary storage device 113.

The input device 114 includes a mouse, a keyboard, and the like, and is used for the user 1u to input various information items for the process conducted by the client terminal 100. The display device 115 displays various information items under control of the CPU 111. The input device 114 and the display device 115 may be an integrated user interface such as a touch panel.

The peripheral device connection I/F 116 serves as an interface to connect one or more peripheral devices being connectable by a Universal Serial Bus (USB) or the like. The card reader 4, the biometric information reader 6, and the like are connected to the peripheral device connection I/F 116. The communication I/F 117 controls wireless or wired communication through the network 2. The control by the communication I/F 117 is not limited to the wireless or wired communication.

For example, the program for realizing the process conducted by the client terminal 100 may be provided to the client terminal 100 by a recording medium 119 such as a Compact Disc Read-Only Memory (CD-ROM) or the like.

The drive device 118 interfaces between the recording medium 119, which is set into the drive device 118, and the client terminal 100.

Also, the program for realizing various processes according to the embodiment, which will be described later, is stored in the recording medium 119. The program stored in the recording medium 119 is installed into the client terminal 100 via the drive device 118. The installed program becomes capable of being executed by the client terminal 100.

The recording medium 119 storing the programs is not limited to the CD-ROM, and may be a computer-readable, non-transitory, and tangible medium. As the computer-readable recording medium, the recording medium 119 may be a Digital Versatile Disk (DVD), a Universal Serial Bus (USB) memory, and a semiconductor memory such as a flash memory, instead of the CD-ROM.

The data custody server 200 is regarded as an information processing apparatus controlled by a computer, and operates as a server. The data custody server 200 includes a CPU 211, a main storage device 212, an auxiliary storage device 213, an input device 214, a display device 215, a communication I/F 217, and a drive device 218, which are connected via a bus B2.

The CPU 211 corresponds to a processor that controls the data custody server 200 in accordance with a program stored in the main storage device 212. As the main storage device 212, a RAM, a ROM, and the like are may be used to store or temporarily store the program executed by the CPU 211, data used in a process by the CPU 211, data acquired in the process by the CPU 211, and the like.

A HDD or the like is used as the auxiliary storage device 213, and stores data such as the program. A part of the program stored in the auxiliary storage device 213 is loaded into the main storage device 212, and is executed by the CPU 211, so that various processes are realized. A storage part 230 corresponds to the main auxiliary device 212 and/or the auxiliary storage device 213.

The input device 214 includes a mouse, a keyboard, and the like, and is used for the service provider 1p to input various information items for the process conducted by the data custody server 200. The display device 215 displays various information items under control of the CPU 211. The input device 214 and the display device 215 may be an integrated user interface such as a touch panel. The communication I/F 217 controls a wireless or wired communication through the network 2. The control by the communication I/F 217 is not limited to the wireless or wired communication.

The program for realizing the process conducted by the data custody server 200 may be provided to the data custody server 200 by a recording medium 219 such as a CD-ROM or the like.

The drive device 218 interfaces between the recording medium 219, which is set into the drive device 218, and the data custody server 200. The recording medium 219 may be the CD-ROM or the like.

Also, the program for realizing various processes according to the embodiment, which will be described later, is stored in the recording medium 219. The program stored in the recording medium 219 is installed into the data custody server 200 via the drive device 218. The installed program becomes capable of being executed by the data custody server 200.

The recording medium 219 storing the programs is not limited to the CD-ROM, and may be a computer-readable, non-transitory, and tangible medium. As the computer-readable recording medium, the recording medium 219 may be a DVD, a USB memory, and a semiconductor memory such as a flash memory, instead of the CD-ROM.

The biometric authentication server 300 is regarded as an information processing apparatus controlled by a computer, and operates as a server. The biometric authentication server 300 includes a CPU 311, a main storage device 312, an auxiliary storage device 313, an input device 314, a display device 315, a communication I/F 317, and a drive device 318, which are connected via a bus B3.

The CPU 311 corresponds to a processor that controls the biometric authentication server 300 in accordance with a program stored in the main storage device 312. As the main storage device 312, a RAM, a ROM, and the like are may be used to store or temporarily store the program executed by the CPU 311, data used in a process by the CPU 311, data acquired in the process by the CPU 311, and the like.

A HDD or the like is used as the auxiliary storage device 313, and stores data such as the program. A part of the program stored in the auxiliary storage device 313 is loaded into the main storage device 312, and is executed by the CPU 311, so that various processes are realized. A storage part 330 corresponds to the main auxiliary device 312 and/or the auxiliary storage device 313.

The input device 314 includes a mouse, a keyboard, and the like, and is used for the service provider 1p to input various information items for the process conducted by the biometric authentication server 300. The display device 315 displays various information items under control of the CPU 311. The input device 314 and the display device 315 may be an integrated user interface such as a touch panel. The communication I/F 317 controls wireless or wired communication through the network 2. The control by the communication I/F 317 is not limited to the wireless or wired communication.

The program for realizing the process conducted by the biometric authentication server 300 may be provided to the biometric authentication server 300 by a recording medium 319 such as a CD-ROM or the like.

The drive device 318 interfaces between the recording medium 319, which is set into the drive device 318, and the biometric authentication server 300. The recording medium 319 may be the CD-ROM or the like.

Also, the program for realizing various processes according to the embodiment, which will be described later, is stored in the recording medium 319. The program stored in the recording medium 319 is installed into the biometric authentication server 300 via the drive device 318. The installed program becomes capable of being executed by the biometric authentication server 300.

The recording medium 319 storing the programs is not limited to the CD-ROM, and may be a computer-readable, non-transitory, and tangible medium. As the computer-readable recording medium, the recording medium 319 may be a DVD, a USB memory, and a semiconductor memory such as a flash memory may be used, instead of the CD-ROM.

In FIG. 1, in a case of integrating the data custody server 200 and the biometric authentication server 300 into one server, the one server serves as those.

Figure 3:
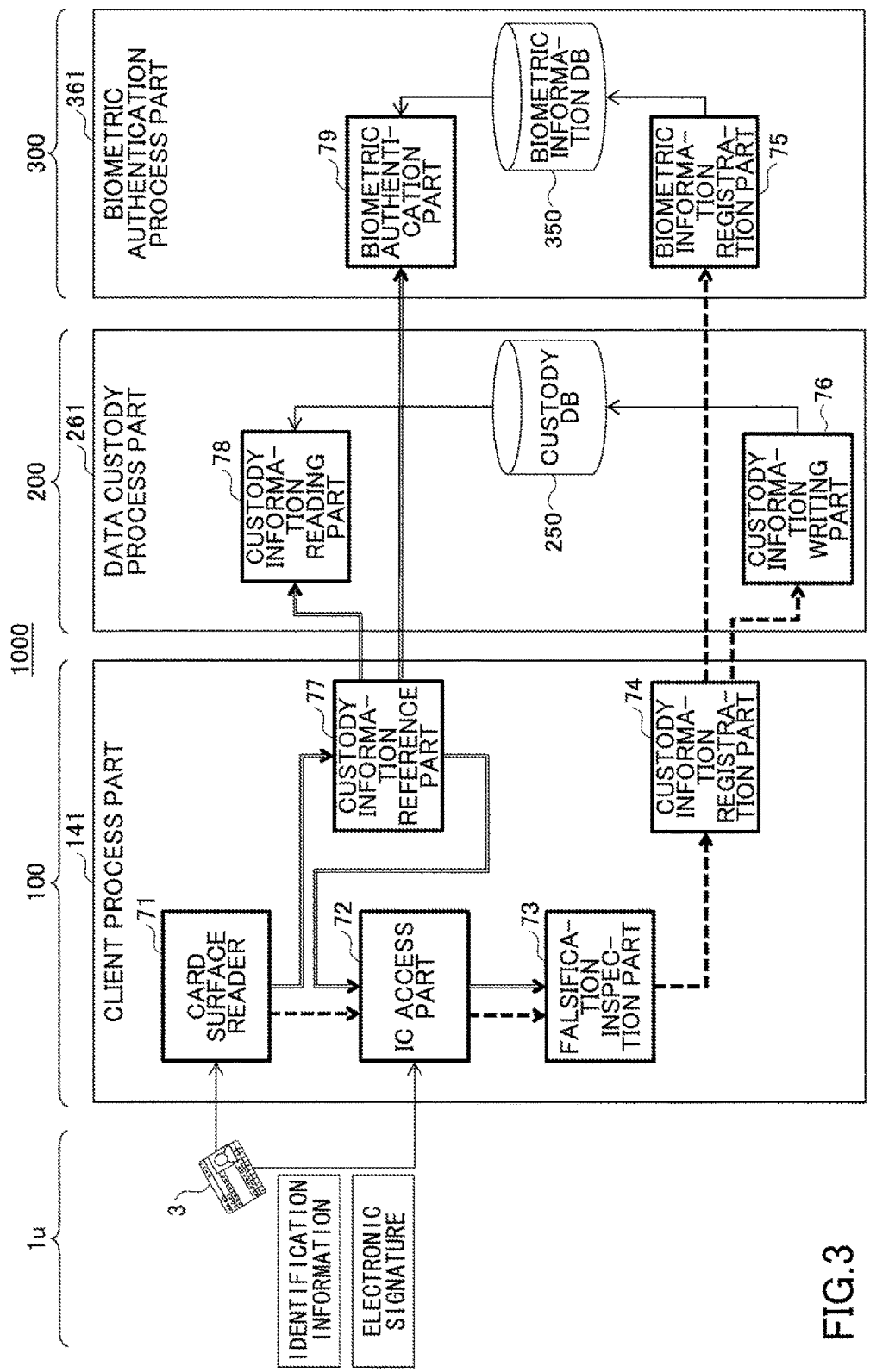
FIG. 3 is a diagram illustrating an example of a functional configuration of the system.

FIG. 3 is a diagram illustrating an example of a functional configuration of the system. In FIG. 3, the system 1000 includes a client process part 141, a data custody process part 261, and a biometric authentication process part 361.

The client process part 141 is realized by a process, which the CPU 111 of the client terminal 100 performs by executing the client application 140 in FIG. 1. The client process part 141 includes a card surface reading part 71, an IC access part 72, a falsification inspection part 73, a custody information registration part 74, and a custody information reference part 77.

The card surface reading part 71 controls the card reader 4, reads a surface of the authentication IC card 3, and generates a management number for identifying the authentication IC card 3.

The IC access part 72 conducts an IC authentication by a password, and reads in identification information and an electronic signature. When the password is registered, the IC access part 72 conducts the IC authentication by using the password entered by the user 1u. Also, when receiving the password (included in the custody data 251) from the data custody server 200, the IC access part 72 acquires the password by decrypting the custody data 251, and conducts the IC authentication.

The falsification inspection part 73 verifies whether the identification information read by the IC access part 72 is falsified. After presence or absence of falsification is confirmed, the falsification inspection part 73 prompts an operator such as a person in charge of an investigation at a counter to check the user 1u by eyes, and acquires an eye check result. At the registration, when the user 1u desires custody service, the falsification inspection part 73 sends a registration request to the custody information registration part 74.

In response to the registration request received from the falsification inspection part 73, the custody information registration part 74 acquires the pass phrase 341 by registering the biometric information 351 acquired from the user 1u, generates the custody data 251 by encrypting the password and the like by using at least the pass phrase 341, and registers the generated custody data 251 in the data custody server 200. In the embodiment, for the encryption, the pass phrase 341 and the management number are used.

The custody information reference part 77 decrypts the custody data 251 acquired from the data custody server 200 by using the management number generated by the card surface reading part 71, by using at least the pass phrase 341 acquired from the biometric authentication server 300. The password is acquired. When the password is acquired, it becomes possible for the IC access part 72 to access the authentication IC card 3.

The data custody process part 261 is realized by a process, which the CPU 211 of the data custody server 200 performs by executing the data custody application 240 in FIG. 1. The data custody process part 261 includes a custody information writing part 76, and a custody information reading part 78, and refers to the custody DB 250 in the storage part 230.

The custody information writing part 76 stores the custody data 251 received from the client terminal 100 in the custody DB 250 in an encrypted state.

The authentication part 79 acquires the custody data 251 from the custody DB250 by using the management number received from the client terminal 100, and sends the custody data 251 in the encrypted state to the client terminal 100.

The biometric authentication process part 361 is realized by a process, which the CPU 111 of the client terminal 100 performs by executing the client application 140 in FIG. 1. The biometric authentication process part 361 includes a biometric information registration part 75, and a biometric authentication part 79, and refers to the biometric information DB 350 in the storage part 330.

The biometric information registration part 75 registers multiple sets of the biometric information 351 for one or more biometric types of the user 1u in the biometric information DB 350. In the embodiment, even if the multiple sets of the biometric information 351 are registered with one biometric type, and even if the multiple sets of the biometric information 351 are registered with different multiple biometric types, respectively, the multiple types and the multiple sets of the biometric information 351 are maintained so as to uniquely provide the pass phrase 341 to the client terminal 100.

The biometric authentication part 79 receives the biometric information 351 and the biometric type of the user 1u from the client terminal 100, and registers the biometric authentication by referring to the biometric information DB 350. When the biometric authentication is successful, the biometric authentication part 79 sends the pass phrase 341 to the client terminal 100.

As described above, in the embodiment, the management number is associated with the custody data 251 in order to acquire the custody data 251 for each of multiple authentication IC cards 3 of the user 1u. Also, the pass phrase 341 is associated with multiple sets of the biometric information 351. Hence, for any one of the biometric types, it is possible to provide the unique pass phrase 341 to the client terminal 100 at the biometric authentication.

Accordingly, in the embodiment, it is possible to solve the inconvenience due to the dispersion of the biometric information 351 entered at the client terminal 100.

In the system 1000 as described above, when the custody data 251 are newly registered, the custody data 251 are registered by the card surface reading part 71, the IC access part 72, the falsification inspection part 73, the custody information registration part 74, the biometric information registration part 75, and the custody information writing part 76.

The custody data 251 are referred to by the card surface reading part 71, the custody information reference part 77, the custody information reading part 78, the biometric authentication part 79, the IC access part 72, and the falsification inspection part 73. Various processes pertinent to the registration, the reference, and the like will be described later with process sequences.

Next, respective examples of data structures of the custody DB 250 and the biometric information DB 350 will be described.

Figure 4:
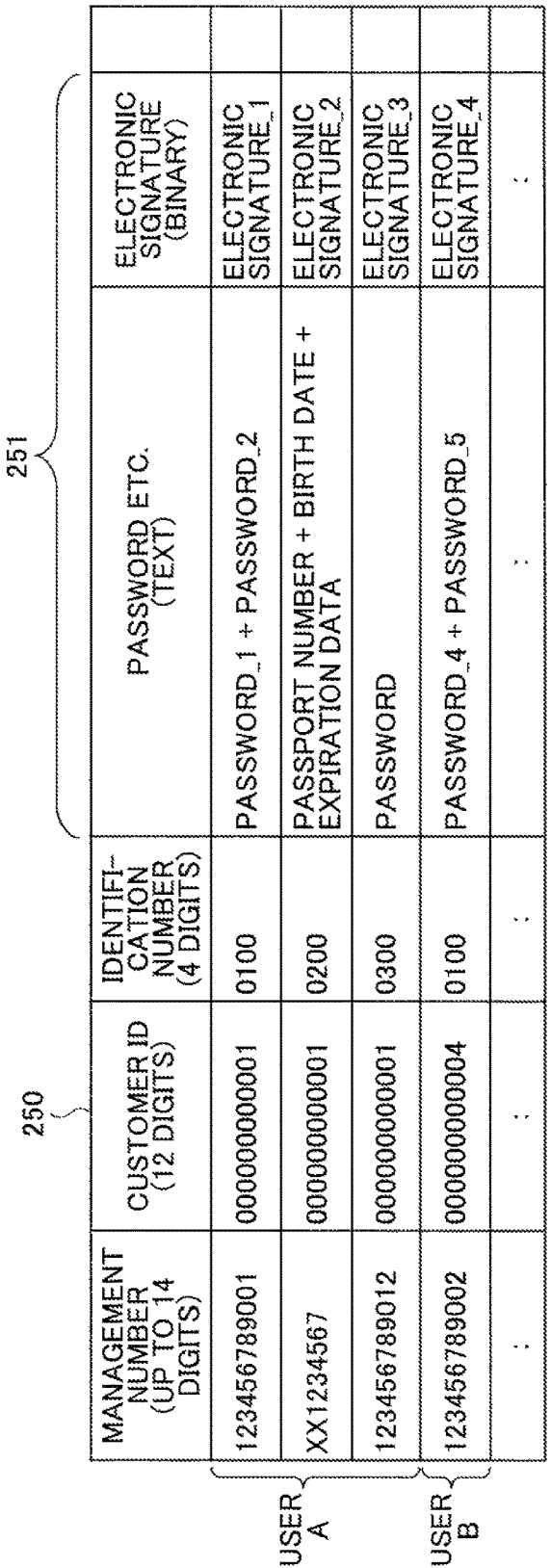
FIG. 4 is a diagram illustrating an example of a data structure of a custody DB.

FIG. 4 is a diagram illustrating an example of a data structure of the custody DB. In FIG. 4, the custody DB 250 stores and maintains the custody data 251 such as the password and the like for each of the authentication IC cards 3 possessed by the user 1u, and includes items of a maintenance number, a customer id, an identification number, password etc., an electronic signature, and the like.

The maintenance number is a numeral up to 14 digits to maintain the custody data 251 pertinent to the authentication IC card 3, and indicates an identification number generated based on information acquired from the surface of the authentication IC card 3 being a warrant card.

When the authentication IC card 3 is the driver's license 3b, the management number indicates a driver's license number. When the authentication IC card 3 is the passport 3a, the management number indicates the passport number. When the authentication IC card 3 is the personal number card 3c, the management number may indicate 14 digits, that is, 6 digits for the birthday or a personal number, 4 digits for an expiration year, and 4 digits for a security code.

The customer ID indicates 12 digits for identifying the user 1u possessing one or more authentication IC cards 3. In the embodiment, the customer ID indicates the biometric information registration ID initially numbered at the registration of the biometric information 351 to the biometric information DB 350. Even if the user 1u registers the custody data 251 pertinent to the multiple authentication IC cards 3, the user 1u is discriminated by one customer ID.

The identification number indicates a 4 digit ID for specifying the authentication IC card 3 as the warranty card. The identification number indicates a value being coded based on an application identification (AID) of the authentication IC card 3.

In the embodiment, the type of the warranty card is indicated by the identification number. For instance, in a case of the driver's license 3b, the identification number indicates "0100". In a case of the passport 3a, the identification number indicates "0200". In a case of the personal number card 3c, the identification number indicates "0300".

The password, etc., indicates, by text, a number of the like being confidential to access the authentication IC card 3. When the authentication IC card 3 is the driver's license 3b, a password number 1 and a password number 2 are indicated. When the authentication IC card 3 is the passport 3a, the passport number, the birthday, and an expiration date are indicated as the password etc.

The electronic signature indicates, by binary code, the electronic signature in the IC chip of the authentication IC card 3. When the authentication IC card 3 is the driver's license 3b, an electronic signature_1 is indicated.

The custody data 251 includes the password, etc., and the electronic signature. The custody data 251 are encrypted, and are retained in the custody DB 250.

In a data example depicted in FIG. 4, respective sets of the custody data 251 of the driver's license 3b, the passport 3a, and the personal number card 3c related to the user A are retained. The biometric information registration ID is indicated by the customer ID for all sets of the custody data 251. The biometric information registration ID "000000000001" is given when the biometric information of the user A is initially registered, when one set of the custody data 251 for either one of the driver's license 3b, the passport 3a, and the personal number card 3c is registered. Accordingly, the same customer ID "000000000001" is applied for all three types of the authentication IC cards 3.

For the driver's license 3b of the user A, the management number "123456789001" is given, and the identification number "0100" is given. For the custody data 251 of the user A, the password, etc., indicates "PASSWORD_1" and "PASSWORD_2", and the electronic signature indicates "ELECTRONIC SIGNATURE_1".

Also, for the passport 3a of the user A, the management number "XX1234567" and the identification number "0200" are indicated. As the custody data 251, the passport number etc. indicates "PASSPORT NUMBER", "BIRTHDATE", and "EXPIRATION DATE", and the electronic signature indicates "ELECTRONIC SIGNATURE_2".

Furthermore, for the personal number card 3c of the user A, the management number "123456789012" and the identification number "0300" are indicated. As the custody data 251, the password, etc., indicates "PASSWORD", and the electronic signature indicates "ELECTRONIC SIGNATURE_3".

For the user B, the custody data 251 of the driver's license 3b is retained. The biometric information registration ID "000000000004" is given at the initial registration of the biometric information 351 of the user B when the custody data 251 of the driver's license 3b is registered, and is indicated by the customer ID.

For the driver's license 3b of the user B, the management number "123456789002" is indicated, and the identification number "0100" is indicated. As the custody data 251, the password, etc., indicates "PASSWORD_4" and "PASSWORD_5", and the electronic signature indicates "ELECTRONIC SIGNATURE_4".

FIG. 5 is a diagram illustrating an example of the data structure of the biometric information DB. In FIG. 5, the biometric information DB 350 stores and maintains multiple sets of the biometric information 315 for each of the biometric types of the user 1u possessing the authentication IC card 3, and includes items of a biometric registration ID, a customer ID, a biometric type, biometric information, and the like.

The biometric information registration ID indicates an identification of 12 digits given for each set of the biometric information 315. The customer ID indicates the biometric information registration ID represented by 12 digits, which is given when the biometric information 315 is initially registered, for each of the users 1u.

The biometric type indicates a 2 digit number for specifying the biometric information 351 for generating the pass phrase 341 used to generate the encryption key of the custody data 251, or a 2 digit number indicating a type of the biometric part 5. For the biometric information 351 used to generate the pass phrase 341, the biometric type "00" is indicated. For the biometric information 351 used to the biometric authentication, the biometric type "01" is indicated in a case of the palm 5a, and the biometric type "03" is indicated in a case of the face 5c.

The biometric information as the item indicates the biometric information 351 of the body part 5. Multiple sets of palm vein information are stored in a case of the palm 5a, multiple sets of fingerprint information are stored in a case of the finger 5b, and a face image is stored in a case of the face 5c.

In a data example depicted in FIG. 5, a case of registering two sets of the biometric information 351 at a first time and a second time will be described. Even in a case in which the biometric information 351 may be acquired three times or more, and the entire or a part of three sets of the biometric information 351 are registered, a manner described below may be applied.

The user A registers the palm 5a alone for the biometric authentication. For the user A, three records exist, and are discriminated by the biometric information registration IDs "000000000001", "000000000002", and "000000000003". With respect to all three records, the customer ID for specifying the user A is "000000000001".

For the biometric information 351 for generating the pass phrase 341 of the user A, a first time palm vein information is used, and "00" is set as the biometric type. The first time palm vein information and the biometric type are associated with the biometric information registration ID "000000000001". The first palm vein information is again stored. In this case, "01" is set to the biometric type. The first palm vein information and the biometric type are associated with the biometric information registration ID "000000000002". Also, for the second palm vein information, "01" is similarly set as the biometric type. The second palm vein information and the biometric type are associated with the biometric information registration ID "000000000003".

Referring to the data example of the custody DB 250 in FIG. 4, the user A registers the respective sets of the custody data 251 including the password and the like used to access the multiple authentication IC card 3, for three types of the warrant cards. On the other hand, referring to FIG. 5, the biometric information 351 of the palm 5a alone is registered by the user A in the biometric information DB 350.

That is, in a case of the user A, with respect to the three warrant cards, the biometric authentication is conducted by the palm 5a to access respective authentication IC cards 3.

The user B registers multiple sets of the biometric information 351 for the palm 5a, the face 5c, and the finger 5b. For the user B, seven records exist, and are specified by the biometric information registration ID "000000000004", "000000000005", "000000000006", "000000000007", "000000000008", "000000000009", and "000000000010". For all seven records, the customer ID for identifying the user B is "000000000004".

The first palm vein information is used, and "00" is set as the biometric type, for the biometric information 351 for generating the pass phrase 341 of the user B. The first palm vein information and the biometric type "00" are associated with the biometric information registration ID "000000000004". The first palm vein information is again stored, but "01" is set as the biometric type. The first palm vein information and the biometric type "01" are associated with the biometric information registration ID "000000000005". Also, "01" is set as the biometric type for the second palm vein information. Similarly, "01" is set to the biometric type. The second palm vein information and the biometric type "01" are associated with the biometric information registration ID "000000000006".

In accordance with the biometric information registration ID, the body part 5, which the user B registered next, is the face 5c, and the biometric information 351 of the face 5c is stored twice. A first face image is stored with the biometric type "02". The first face image and the biometric type "02" are associated with the biometric information registration ID "000000000007". In the same manner, a second face image is stored with the biometric type "02". The second face image and the biometric type "02" are associated with the biometric information registration ID "000000000008". The biometric information 351 of the face 5c, which is not used to generate the pass phrase 341, is maintained by two records.

The body part 5, which is further registered by the user B, is the finger 5b. The biometric information 351 of the finger 5b is stored twice. The first fingerprint information is stored with the biometric type "03". The first fingerprint information and the biometric type "03" are associated with the biometric information registration ID "000000000009". Similarly, a second fingerprint information is stored with the biometric type "03". The second fingerprint information and the biometric type "03" are associated with the biometric information registration ID "000000000010". The biometric information 351 of the finger 5b, which is not used to generate the pass phrase 341, is maintained by two records.

Referring to the data example of the custody DB 250 in FIG. 4, the user B registers the custody data 251 including the password and the like to access the authentication IC card 3, which is only one type of the warrant card. On the other hand, referring to FIG. 5, the user B registers the multiple sets of the biometric information 351 in the biometric information DB 350 for three types: the palm 5a, the finger 5b, and the face 5c.

That is, it is possible for the user B to conduct the biometric authentication to access the authentication IC card 3 by the palm 5a, the finger 5b, and the face 5c.

Next, the process sequence related to various processes conducted in the system 1000 will be described. First, a new registration process of the custody data 251 will be described. FIG. 6A, FIG. 6B, FIG. 6C, and FIG. 6D are diagrams illustrating a process sequence for explaining the new registration process in the system in the embodiment.

Figure 6A:
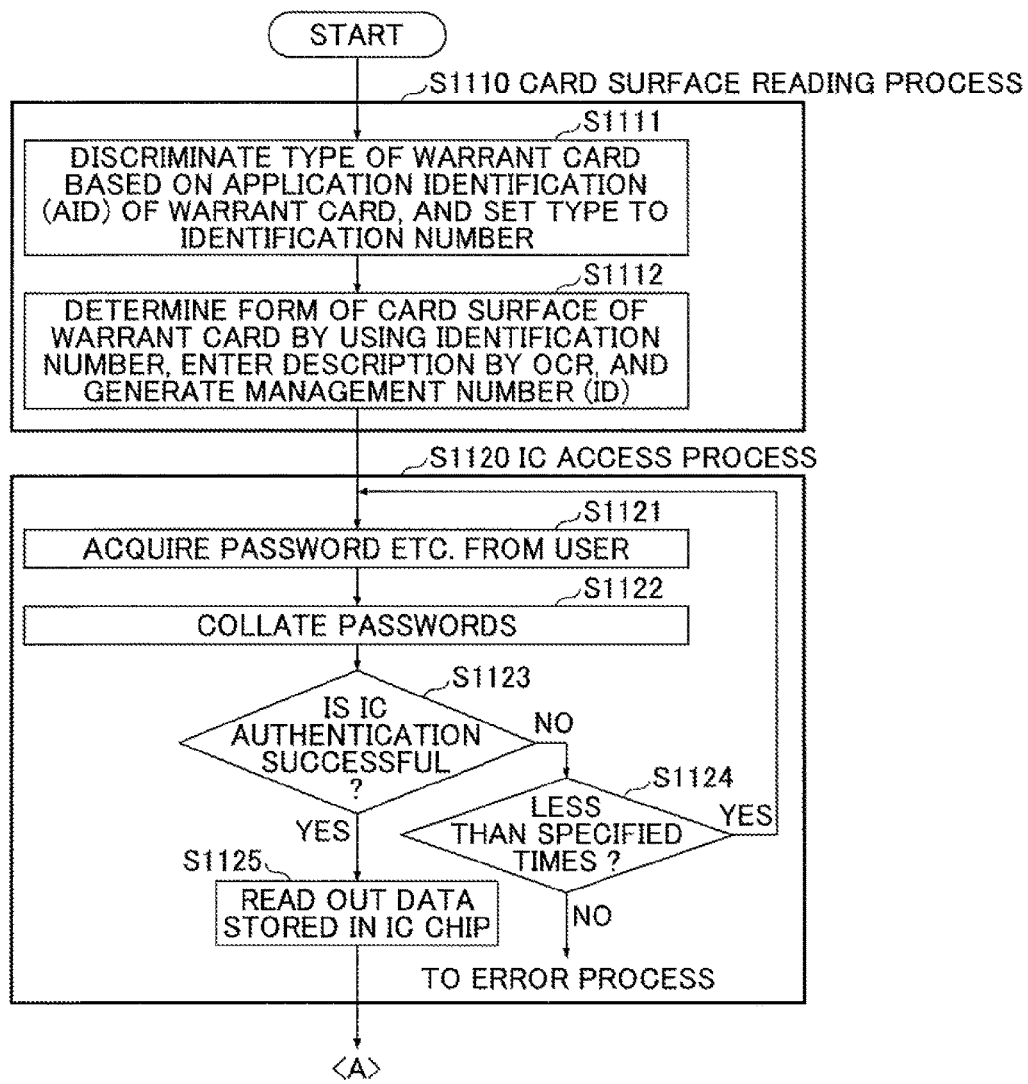

In FIG. 6A, at the client terminal 100, the card surface reading part 71 performs a card surface reading process (step S1110). In step S1110, the card surface reading part 71 performs the card surface reading process described below.

The card surface reading part 71 discriminates a type by the application identification (AID) of the authentication IC card 3 being the official warrant card, and sets the discriminated type to the identification number (step S1111).

After that, the card surface reading part 71 determines the format of the surface of the authentication IC card 3 by using the identification number, performs an Optical Character Recognition (OCR) to read a description on the surface, and generates the management number (ID) (step S1112).

The card surface reading part 71 reads the surface by the card reader 4 (the easy scanner 4a, the IC card reader 4b, and the like), and takes in text information acquired by performing the OCR of the description (the management number, and the like) on the surface of the warrant card. In a case in which the OCR has resulted as an error, the card surface reading part 71 displays a card surface image information on the display device 115, and modifies the text information with modification data received from the input device 114 by an operation of an operator (a person in charge of an investigation at a counter or the like).

Also, the card surface reading part 71 generates the management number to be warrant card identification information by using the surface image information being read and the text information recognized by the OCR, and temporarily stores the generated management number in a temporary storage area in the storage part 130 in order to use it in the following processes. After that, the card surface reading part 71 terminates this card surface reading process.

Next, the IC access part 72 performs the IC access process (step S1120). In the step S1120, the IC access process is conducted as described below.

The IC access part 72 acquires the password and the like used for the IC authentication from the user 1u (step S1121). The IC access part 72 displays a screen on the display device 115 to urge the user 1u to enter the password used for the IC authentication, and has the user 1u enter the password by the input device 114.

When the password entered by the user 1u is received from the input device 114, a collation is conducted by the IC chip between the password entered by the user 1u with the password in the IC chip of the authentication IC card 3 (step S1122).

The IC access part 72 determines whether the IC authentication is successful (step S1123). When the password entered by the user 1u is identified to the password in the IC chip of the authentication IC card 3, the IC authentication succeeds.

When the IC authentication has failed (NO of step S1123), the IC access part 72 repeats an entry of the password and the IC authentication until entry times reach specified times or a cancel operation is conducted by the user 1u (step S1124). In a case in which the IC authentication is canceled or is not performed due to the specified times, or in a case in which an error occurs when the IC chip of the authentication IC card 3 is read, the IC access part 72 displays a message on the display device 115 and terminates the IC access process. In this case, the user 1u follows an instruction of the operator such as the person in charge at the counter.

When the IC authentication is successful (YES of step S1123), the IC access part 72 reads in data from the IC chip of the authentication IC card 3, and stores identification information and the electronic signature in the temporary storage area in the storage part 130 (step S1125), and terminates the IC access process.

After that, the falsification inspection process is conducted by the falsification inspection part 73 (step S1130). In step S1130, the falsification inspection process is conducted as described below.

The falsification inspection part 73 conducts a falsification inspection below by using the identification information and the electronic signature read from the IC chip of the authentication IC card 3, and displays a falsification inspection result on the display device 115 (step S1131).

a. The falsification inspection part 73 checks the presence or absence of the falsification of the identification information by the signature verification using data of the electronic signature in the IC chip and the identification information in the IC chip.

b. The falsification inspection part 73 checks an authenticity of a certificate authority based on a certificate verification of the electronic signature by using a public key certificate, which is acquired from the certificate authority of the official warrant card, that is, the authentication IC card 3.

The falsification inspection part 73 determines whether the falsification inspection result indicates a normal end (step S1132). When the falsification inspection result does not indicate the normal end (NO of step S1132), that is, when the authentication IC card 3 may be falsified, the falsification inspection part 73 displays the message on the display device 115 and stops the falsification inspection process. In this case, the user 1u follows the instruction of the operator such as the person in charge at the counter.

When the falsification inspection result indicates the normal end (YES of step S1132), the falsification inspection part 73 acquires the face picture from the identification information stored by the IC access part 72 in the temporary area, and displays it on the display device 115 for the operator (the person in charge at the counter) to check between the face picture and a face of the user 1u by eyes and to input the eye check result (step S1133).

The falsification inspection part 73 makes a final decision of the identity confirmation based on the falsification inspection and the eye confirmation result (step S1134). When the falsification inspection normally ends and the eye confirmation result indicates that the user 1u is identified, the falsification inspection part 73 makes the final decision as the user 1u is identified. Even if the falsification inspection normally ends, when it is decided by the eye confirmation that the user 1u is not identical (NO of step S1134), the falsification inspection part 73 stops the falsification inspection process. In this case, the user 1u follows the instruction of the operator such as the person in charge or the like.

When it is determined as the final decision that the user 1u is identified (YES of step S1134), the falsification inspection part 73 may confirm whether the user 1u desires to use the custody service for the password or the like. When the user 1u does not use the custody service, it is determined that the user 1u maintains the confidential information such as the password or the like. Then, the new registration process is terminated. On the other hand, when the user 1u agrees to use the custody service, the following process is further conducted.

Referring to FIG. 6B, a custody information registration process is performed by the custody information registration part 74 (step S1140). In step S1140, the custody information registration process is conducted as described below.

The custody information registration part 74 acquires the biometric information 351 from the user 1u (step S1141). By receiving the biometric information 351 input by the user 1u from the biometric information reader 6, the biometric information 351 of the user 1u is acquired. In order to level an authentication accuracy at the biometric authentication, the biometric information 351 is input by the user 1u several times. Multiple sets of the biometric information 351 are acquired, and are collated with each other, so as to secure an identity of the user 1u and the authentication accuracy. In the embodiment, the biometric information 351 is input three times. A collation between the first biometric information 351 and the second biometric information 351, and a collation between the second biometric information 351 and a third biometric information 351 are conducted, so as to secure the identity of the multiple sets of the acquired biometric information 351 and the authentication accuracy.

The custody information registration part 74 determines whether the biometric information 351 is properly acquired (step S1142). When the biometric information 351 is not properly acquired (NO of step S1142), the custody information registration part 74 goes back to step S1141, and further acquires the biometric information 351 from the user 7u.

On the other hand, when the biometric information 351 is properly acquired (YES of step S1142), the custody information registration part 74 sends the biometric type and the biometric information 351 to the biometric authentication server 300, and initially registers the biometric information 351 (step S1143). In the embodiment, the custody information registration part 74 sends the first biometric information 351 and the second biometric information 351 to the biometric authentication server 300, among the first, the second, and the third sets of biometric information 351. The custody information registration part 74 receives the customer ID and the pass phrase 341 from the biometric authentication server 300, by initially registering the biometric information 351 of the user 1u in the biometric authentication server 300.

The custody information registration part 74 generates the encryption key by using the pass phrase 341 and the management number (step S1144). The custody information registration part 74 encrypts the custody data 251 (the password, the electronic signature, and the like) by the generated encryption key (step S1145). The custody data 251 include the password, the electronic signature, and the like.

The custody information registration part 74 sends the management number, the customer ID, the identification number, and the encrypted custody data 251 to the data custody server 200, and registers the custody data 251 of the user 1u (step S1146). The custody information registration part 74 terminates the custody information registration process. Also, the new registration process is terminated in the system 1000.

Figure 6C:
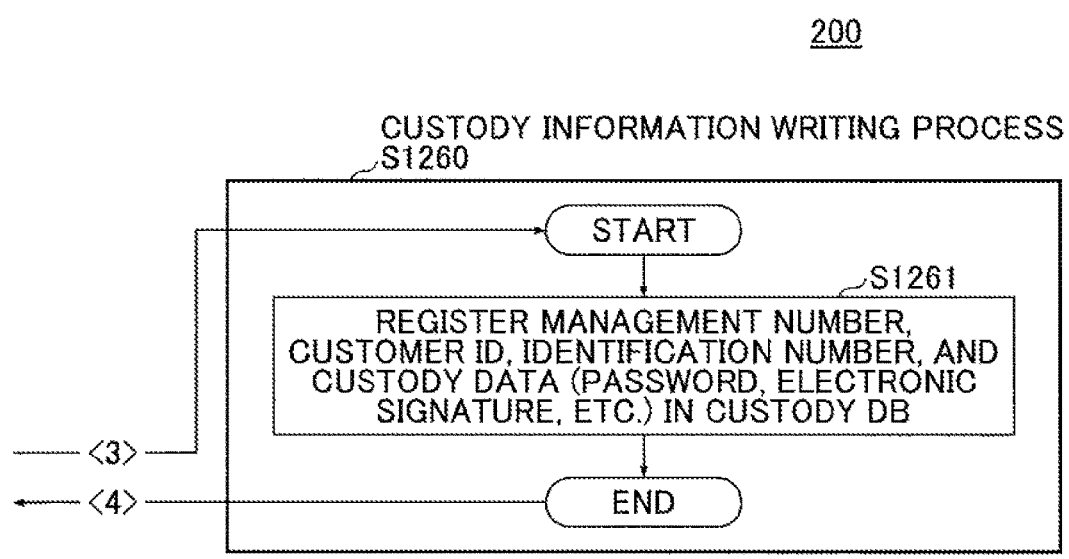
Figure 6D:
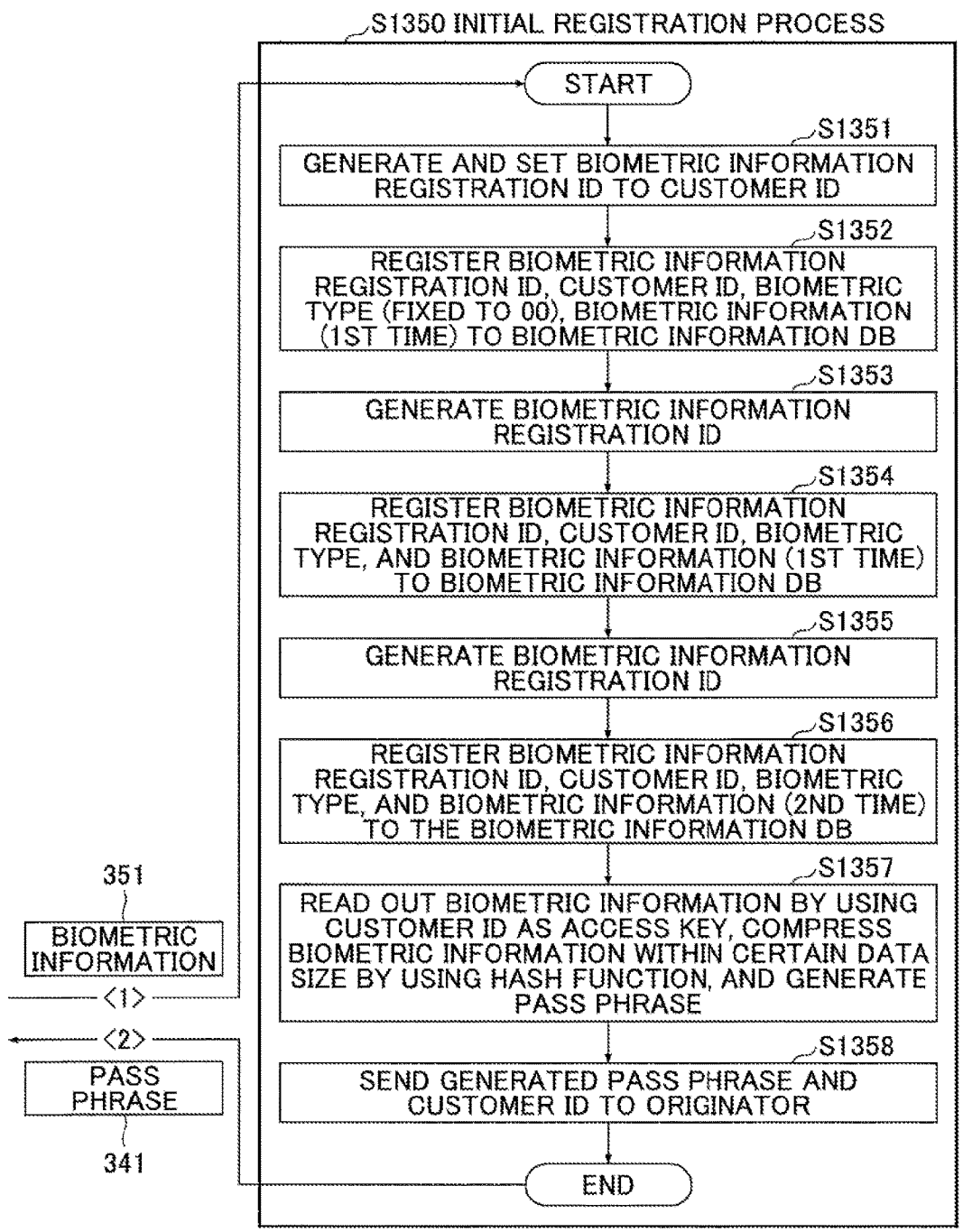

Referring to FIG. 6D, by sending the biometric information 351 from the custody information registration part 74 to the biometric authentication server 300 in step S1143, an initial registration of the biometric information 351 is conducted by the biometric information registration part 75 in the biometric authentication server 300 (step S1350). In step S1350, the initial registration is performed as described below.

The biometric information registration part 75 generates the biometric information registration ID and sets the generated biometric information registration ID in the customer ID (step S1351). The customer ID is regarded as identification information used to identify the user 1u in the biometric authentication server 300. Once the customer ID is set, the customer ID is never changed.

The biometric information registration part 75 registers the generated biometric information registration ID, the customer ID, the biometric type ("00" fixed), and the received first biometric information 351 in the biometric information DB 350 (step S1352). In this case, a value "00" is set by the biometric information registration part 75.

The biometric information registration part 75 generates the biometric information registration ID (step S1353). The biometric information registration part 75 registers the generated biometric information registration ID, the customer ID, the received biometric type, and the first biometric information 351 in the biometric information DB 350 (step S1354). In this case, the first biometric information 351 is again registered.

The biometric information registration part 75 generates the biometric information registration ID (step S1355). The biometric information registration part 75 registers the generated biometric information registration ID, the customer ID, the received biometric type, and the second biometric information 351 in the biometric information DB 350 (step S1356).

The biometric information registration part 75 reads out the biometric information 351 from the biometric information DB 350 by using the customer ID as an access key, compresses the biometric information 351 of the biometric information "00" by using a hash function into a size of a certain length, and generates the pass phrase 341 (step S1357). The biometric information 351 may be compressed to 256 bits.

After compressing the biometric information 351, the biometric information registration part 75 sends the generated pass phrase 341 and the customer ID to the client terminal 100 of an originator of the request (step S1358), and terminates the biometric information registration process.

Referring to FIG. 6C, by sending the custody data 251 of the data custody server 200 by the custody information registration part 74, a custody information writing process is conducted by the custody information writing part 76 at the data custody server 200 (step S1260). In step S1260, the custody information writing process is conducted as described below.

When receiving the custody data 251 from the client terminal 100, the custody information writing part 76 registers the management number, the customer ID, the identification number, and the custody data 251 in the custody DB 250 (step S1261). The custody data 251 includes the password, the electronic signature, and the like. After the custody data 251 is registered, the custody information writing part 76 terminates the custody information writing process.

Next, a reference process of the custody data 251 will be described in the system 1000 in the embodiment. FIG. 7A, FIG. 7B, FIG. 7C, and FIG. 7D are diagrams illustrating a process sequence for explaining the reference process of the custody data in the system.

Figure 7A:
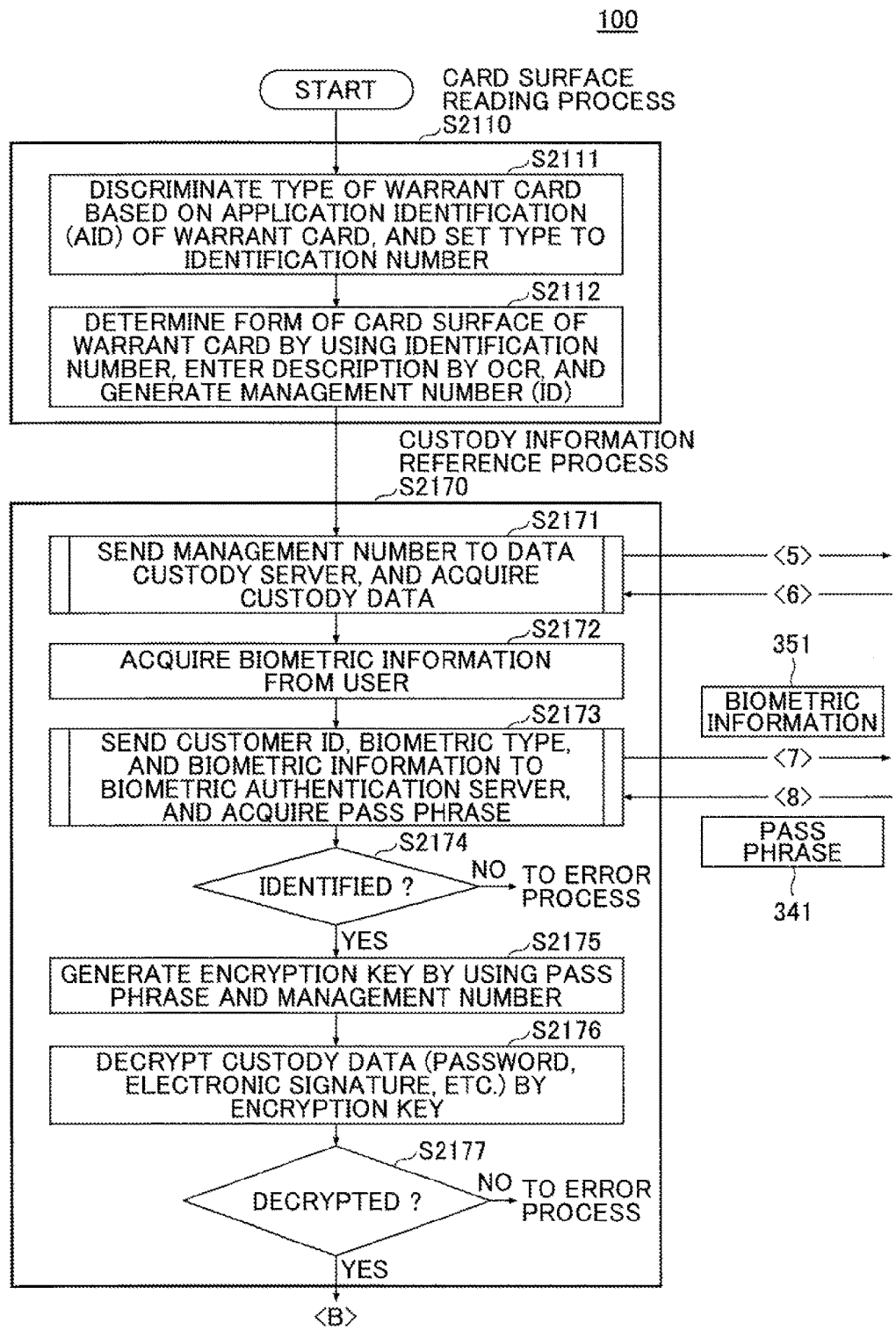
FIG. 7A, FIG. 7B, FIG. 7C, and FIG. 7D are diagram illustrating a process sequence for explaining a reference process of custody data in the system.

Referring to FIG. 7A, at the client terminal 100, the card surface reading part 71 performs the card surface reading process (step S2110). In step S2110, the card surface reading process is conducted as described below.

The card surface reading part 71 discriminates a type by the application identification (AID) of the authentication IC card 3 being the official warrant card, and sets the discriminated type to the identification number (step S2111).

After that, the card surface reading part 71 determines the format of the surface of the authentication IC card 3 by using the identification number, performs the OCR to read the description on the surface, and generates the management number (ID) (step S2112). A process pertinent to the OCR is conducted in the same manner described above. Since the management number is used in a succeeding process, the generated management number is stored in the temporary storage area in the storage part 130. The card surface reading part 71 terminates the card surface reading process.

Next, the custody information reference part 77 conducts a custody information reference process (step S2170). In step S2170, the custody information reference process is conducted as described below.

The custody information reference part 77 sends the management number to the data custody server 200, and acquires the customer ID and the custody data 251 (step S2171). When the custody data 251 is not acquired from the data custody server 200, the custody information reference part 77 stops the custody information reference process, and terminates the reference process of the custody data 251 in the system 1000.

When the custody data 251 is acquired from the data custody server 200, the custody information reference part 77 acquires the biometric information 351 from the user 1*u* (step S2172).

The custody information reference part 77 sends the customer ID, the biometric type, and the biometric information 351 to the biometric authentication server 300, and acquires the pass phrase 341 (step S2173). The custody information reference part 77 determines based on the collation result of the biometric authentication whether the user 1*u* is identified (step S2174). When a report of the biometric authentication error is received (NO of step S2174), the custody information reference part 77 stops the custody information reference. Also, the reference process of the custody data 251 in the system 1000 is terminated. Alternatively, the custody information reference part 77 may determine that the biometric authentication is not properly conducted, and go back to step S2172 to acquire again the biometric information 351 from the user 1*u*. Then, the above described processes may be repeatedly conducted in the same manner. When the biometric authentication is successful (YES of step S2174), the custody information reference part 77 receives the pass phrase 341, and performs further processes described below.

The custody information reference part 77 generates the encryption key by using the received pass phrase 341 and the management number (step S2175). Then, the custody information reference part 77 decrypts the custody data 251 received from the data custody server 200 by the generated encryption key (step S2176).

The custody information reference part 77 determines whether the decryption is successful (step S2177). When the decryption fails (NO of step S2177), the custody information reference part 77 stops the custody information reference. The reference process of the custody data 251 is terminated in the system 1000.

When the decryption is successful (YES of step S2177), the custody information reference part 77 acquires the password, the electronic signature, and the like, and terminates the custody information reference process.

Figure 7B:
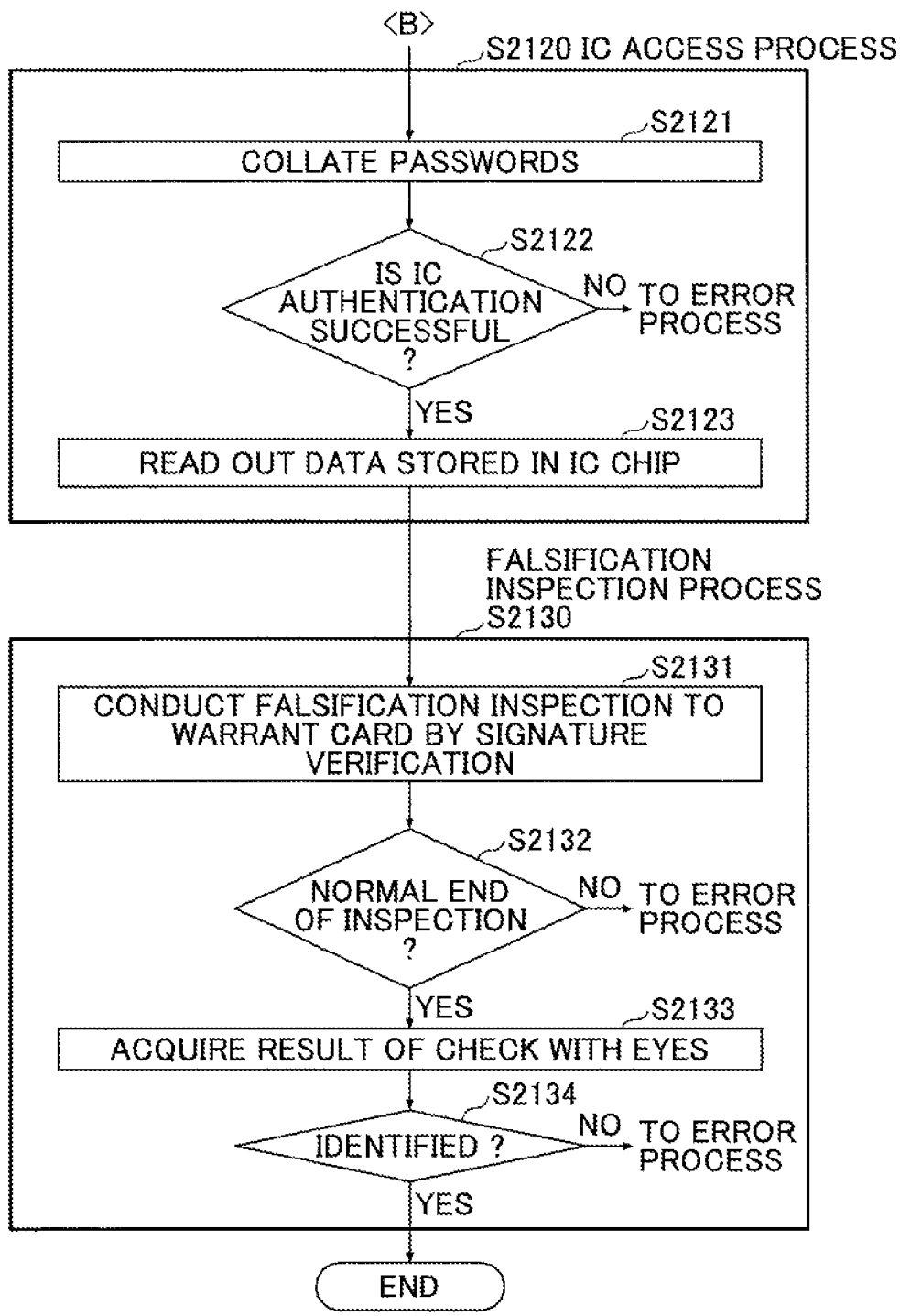
Figure 7C:
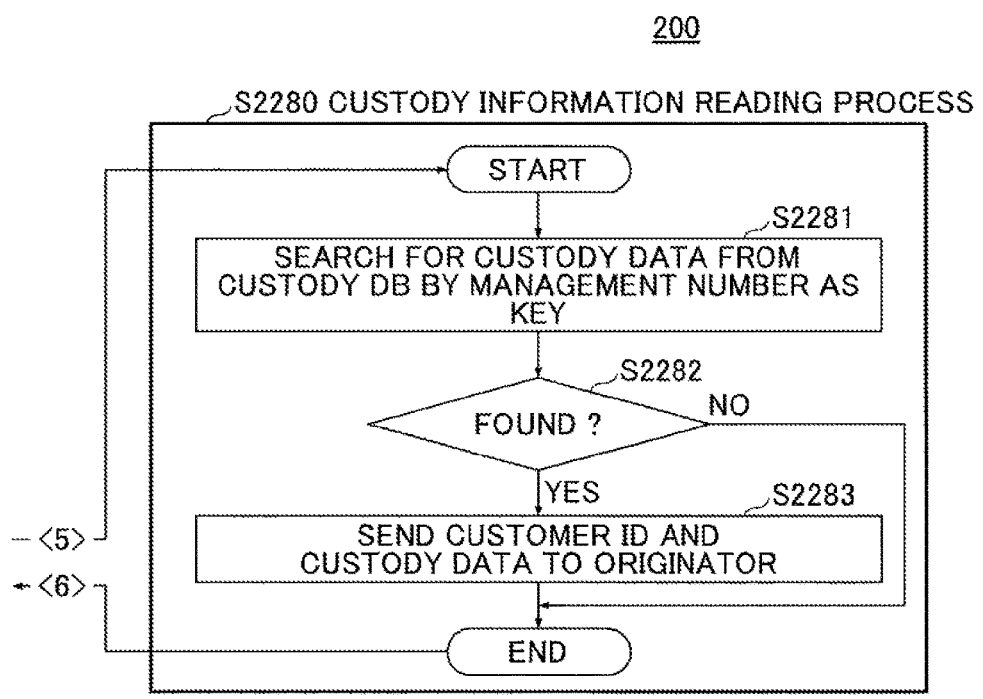

When the custody information reference part 77 sends the management number to the data custody server 200 in step S2171, the data custody server 200 conducts a custody information reading process by the custody information reference part 77 (step S2280 in FIG. 7C). In step S2280, the custody information reading process is conducted as described below.

Referring to FIG. 7C, the custody information reference part 77 searches for the custody data 251 from the custody DB 250 by using the management number received from the client terminal 100 as the key (step S2281). The custody information reference part 77 determines whether the custody data 251 corresponding to the management number exists (step S2282). When the custody data 251 does not exist (NO of step S2282), the custody information reference part 77 terminates the custody information reading process.

When the custody data 251 exists (YES of step S2282), the custody information reference part 77 sends the customer ID and the custody data 251 to the client terminal 100 being the originator of the requests (step S2283). After that, the custody information reading part 78 terminates the custody information reading process.

Figure 7D:
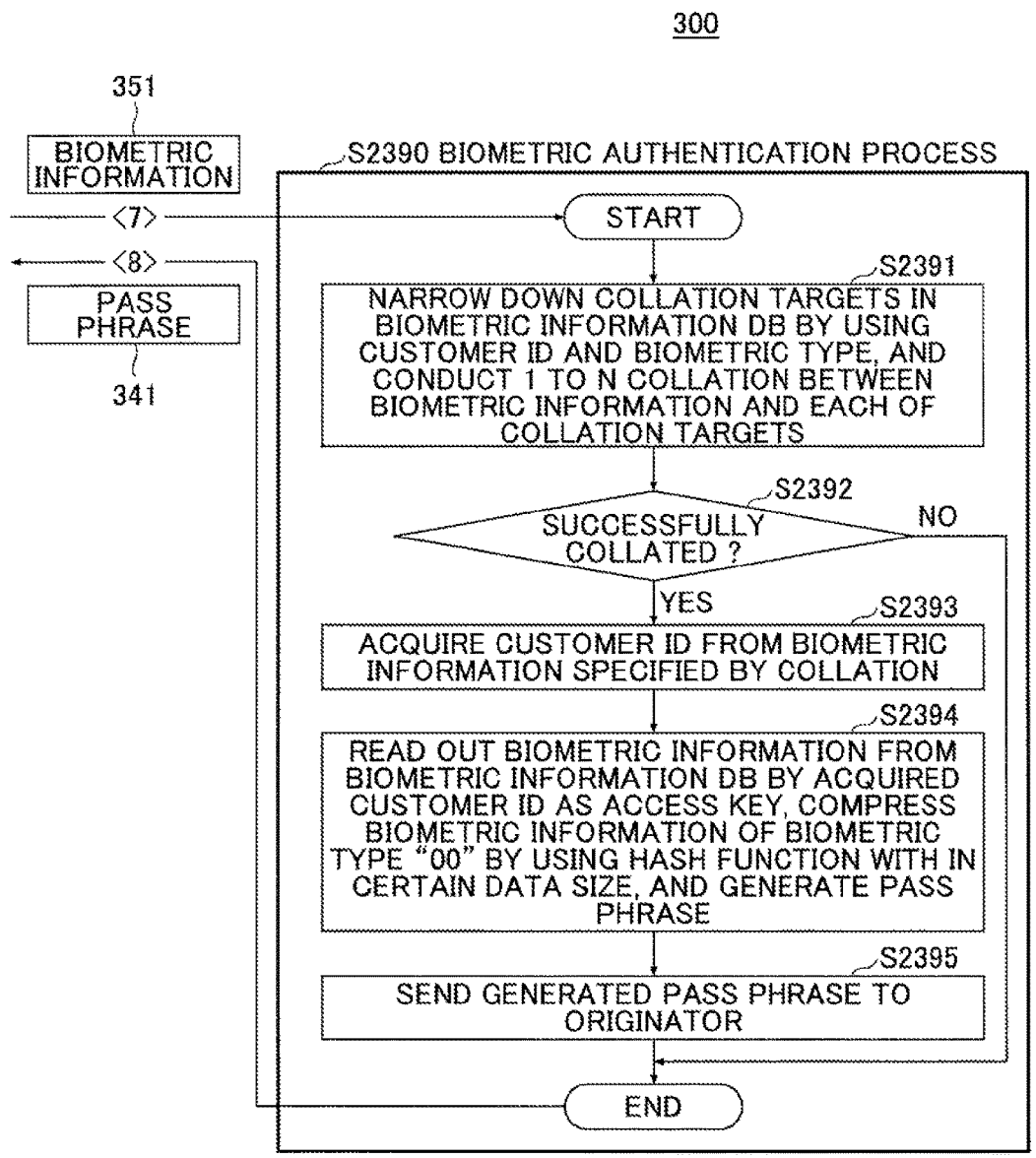

When the custody information reference part 77 sends the biometric information 351 to the biometric authentication server 300 in step S2173 in FIG. 7A, the biometric authentication part 79 conducts the biometric authentication process in the biometric authentication server 300 (step S2390 in FIG. 7D). In step S2390, the biometric authentication process is conducted as described below.

Referring to FIG. 7D, the biometric authentication part 79 narrows collation targets in the biometric information DB 350 by using the customer ID and the biometric type received from the client terminal 100, and conducts the one to many (1:N) collation in which the received biometric information 351 is matched with each of the collation targets (step S2391).

The biometric authentication part 79 determines whether the 1:N collation is successful (step S2392). When the 1:N collation fails (NO of step S2392), that is, when there is no collation target matched with the biometric information 351 of the user 1*u*, the biometric authentication part 79 stops the biometric authentication process. A biometric authentication error is reported to the client terminal 100.

When the 1:N collation is successful (YES of step S2392), that is, when there is the collation target matching with the biometric information 351 of the user 1*u*, the biometric authentication part 79 acquires the customer ID from the matched collation target (step S2393).

After that, the biometric authentication part 79 reads out the biometric information 351 from the biometric information DB 350 by the acquired customer ID as the access key, compresses the biometric information 351 of the biometric information "00" by using the hash function into the size of the certain length, and generates the pass phrase 341 (step S2394). The biometric information 351 may be compressed to 256 bits.

After compressing the biometric information 351, the biometric authentication part 79 sends the generated pass phrase to the client terminal 100 of the originator (step S2395), and terminates the biometric authentication process.

When the custody data 251 are decrypted in the custody information reference process by the custody information reference part 77 in step S2170 at the client terminal 100, the IC access process is conducted by the IC access process part 72 (step S2120 in FIG. 7B). In step S2120, the IC access process is conducted as described below.

Referring to FIG. 7B, the decrypted password is collated with the password stored in the IC chip of the authentication IC card 3 (step S2121). The IC access part 72 determines whether the IC authentication is successful (step S2122).

When the decrypted password is matched with the password in the IC chip of the authentication IC card 3, the IC authentication is successful.

When the IC authentication fails (NO of step S2122), the IC access part 72 displays the message on the display device 115 and stops the IC access process. Also, when a read error of the IC chip occurs, the message is displayed on the display device 115, and the IC access process is stopped. In this case, the user 1u follows the instruction of the operator such as the person in charge at the counter.

When the IC authentication is successful (YES of step S2122), the IC access part 72 reads data from the IC chip of the authentication IC card 3, stores the identification information and the electronic signature in the temporary storage area in the storage part 130 (step S2123), and terminates the IC access process.

After that, the falsification inspection process is conducted by the falsification inspection part 73 (step S2130). In step S2130, the falsification inspection process is conducted as described below.

The falsification inspection part 73 conducts the falsification inspection described below by using the identification information and the electronic signature read from the IC chip of the authentication IC card 3, and displays the falsification inspection result on the display device 115 (step S2131).

a. The falsification inspection part 73 checks the presence or absence of the falsification of the identification information by the signature verification using data of the electronic signature in the IC chip and the identification information in the IC chip.

b. The falsification inspection part 73 checks the authenticity of the certificate authority based on the certificate verification of the electronic signature by using the public key certificate, which is acquired from the certificate authority of the official warrant card, that is, the authentication IC card 3.

When the electronic signature used at a previous verification exists as the custody data 251, and when a setting indicates to allow omission of the certification verification, the electronic signature of the custody data 251 is collated with the electronic signature in the IC chip this time, in order to verify validity of the electronic signature.

Recently, an official individual authentication server, which is provided by an information system organization of a local government, is used. A validity confirmation of the personal number card is charged (the validity verification: 2 yen each time, and the electronic signature: 20 yen each time). When there is electronic signature information as the custody data 251, by collating this electronic signature information with the electronic signature information read out from the IC chip this time, it may be possible to carry out the authenticity determination. Instead of using the official individual authentication server provided the information system organization of the local government, it becomes possible to perform the authenticity determination of the personal number card.

It is preferable to receive information of a change of basic information (an address and the like) of the personal number card, presence or absence of invalidation, and the like, and to use the official individual authentication server every time when it is desired to secure stronger security.

The falsification inspection part 73 determines whether the falsification inspection result indicates the normal end (step S2132). When the falsification inspection result does not indicate the normal end (NO of step S2132), that is, when the authentication IC card 3 may be falsified, the falsification inspection part 73 displays the message on the display device 115 and stops the falsification inspection process. In this case, the user 1u follows the instruction of the operator such as the person in charge at the counter.

When the falsification inspection result indicates the normal end (YES of step S2132), the falsification inspection part 73 acquires the face picture from the identification information stored by the IC access part 72 in the temporary area, and displays it on the display device 115 for the operator (the person in charge at the counter) to check between the face picture and the face of the user 1u by eyes and to input the eye check result (step S2133).

The falsification inspection part 73 makes the final decision of the identity confirmation based on the falsification inspection and the eye confirmation result (step S2134). When the falsification inspection normally ends and the eye confirmation result indicates that the user 1u is identified, the falsification inspection part 73 makes the final decision as the user 1u is identified. Even if the falsification inspection normally ends, when it is decided by the eye confirmation that the user 1u is not identical (NO of step S2134), the falsification inspection part 73 stops the falsification inspection process. In this case, the user 1u follows the instruction of the operator such as the person in charge or the like.

When the final decision is made that the user 1u is identified (YES of step S2134), the falsification inspection part 73 terminates the falsification inspection process. The reference process of the custody data 251 is terminated in the system 1000.

An update process of the custody data 251 will be described in the system 1000 in the embodiment. FIG. 8A, FIG. 8B, FIG. 8C, FIG. 8D, and FIG. 8E are diagrams illustrating a process sequence for explaining an update process of the custody data in the system in the embodiment. The update process of the custody data 251 is conducted when the user 1u changes the password or the like.

Figure 8A:
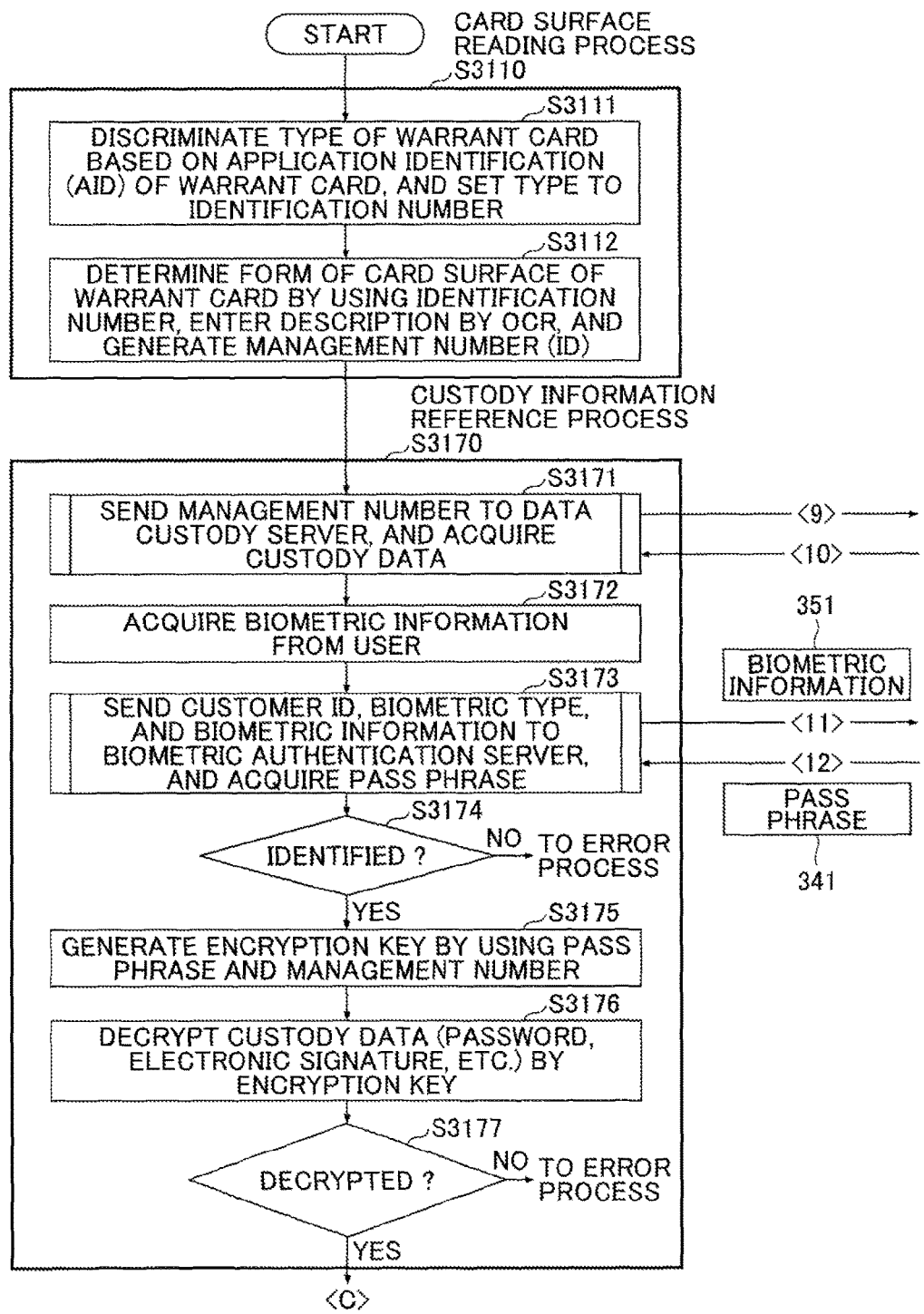
FIG. 8A, FIG. 8B, FIG. 8C, FIG. 8D and FIG. 8E are diagrams illustrating a process sequence for explaining an update process of the custody data in the system.

In FIG. 8A, at the client terminal 100, the card surface reading part 71 performs a card surface reading process (step S3110). In step S3110, the card surface reading part 71 performs the card surface reading process described below.

The card surface reading part 71 discriminates the type by the application identification (AID) of the authentication IC card 3 being the official warrant card, and set the discriminated type to the identification number (step S3111).

After that, the card surface reading part 71 determines the format of the surface of the authentication IC card 3 by using the identification number, performs the OCR to read the description on the surface, and generates the management number (ID) (step S3112). A process pertinent to the OCR is conducted in the same manner described above. Since the management number is used in a succeeding process, the generated management number is stored in the temporary storage area in the storage part 130. The card surface reading part 71 terminates the card surface reading process.

Next, the custody information reference part 77 conducts a custody information reference process (step S3170). In step S3170, the custody information reference process is conducted as described below.

The custody information reference part 77 sends the management number to the data custody server 200, and acquires the customer ID and the custody data 251 (step S3171). When the custody data 251 is not acquired from the data custody server 200, the custody information reference part 77 stops the custody information reference process, and terminates the reference process of the custody data 251 in the system 1000.

When the custody data 251 is acquired from the data custody server 200, the custody information reference part 77 acquires the biometric information 351 from the user 1*u* (step S3172).

The custody information reference part 77 sends the customer ID, the biometric type, and the biometric information 351 to the biometric authentication server 300, and acquires the pass phrase 341 (step S3173). The custody information reference part 77 determines based on the collation result of the biometric authentication whether the user 1*u* is identified (step S3174). When a report of the biometric authentication error is received (NO of step S3174), the custody information reference part 77 stops the custody information reference. Also, the reference process of the custody data 251 in the system 1000 is terminated. Alternatively, the custody information reference part 77 may determine that the biometric authentication is not properly conducted, and go back to step S3172 to acquire again the biometric information 351 from the user 1*u*. Then, the above described processes may be repeatedly conducted in the same manner. When the biometric authentication is successful (YES of step S3174), the custody information reference part 77 receives the pass phrase 341, and performs further processes described below.

The custody information reference part 77 generates the encryption key by using the received pass phrase 341 and the management number (step S3175). Then, the custody information reference part 77 decrypts the custody data 251 received from the data custody server 200 by the generated encryption key (step S3176).

The custody information reference part 77 determines whether the decryption is successful (step S3177). When the decryption fails (NO of step S3177), the custody information reference part 77 stops the custody information reference. The reference process of the custody data 251 is terminated in the system 1000.

When the decryption is successful (YES of step S3177), the custody information reference part 77 acquires the password, the electronic signature, and the like, and terminates the custody information reference process.

Figure 8B:
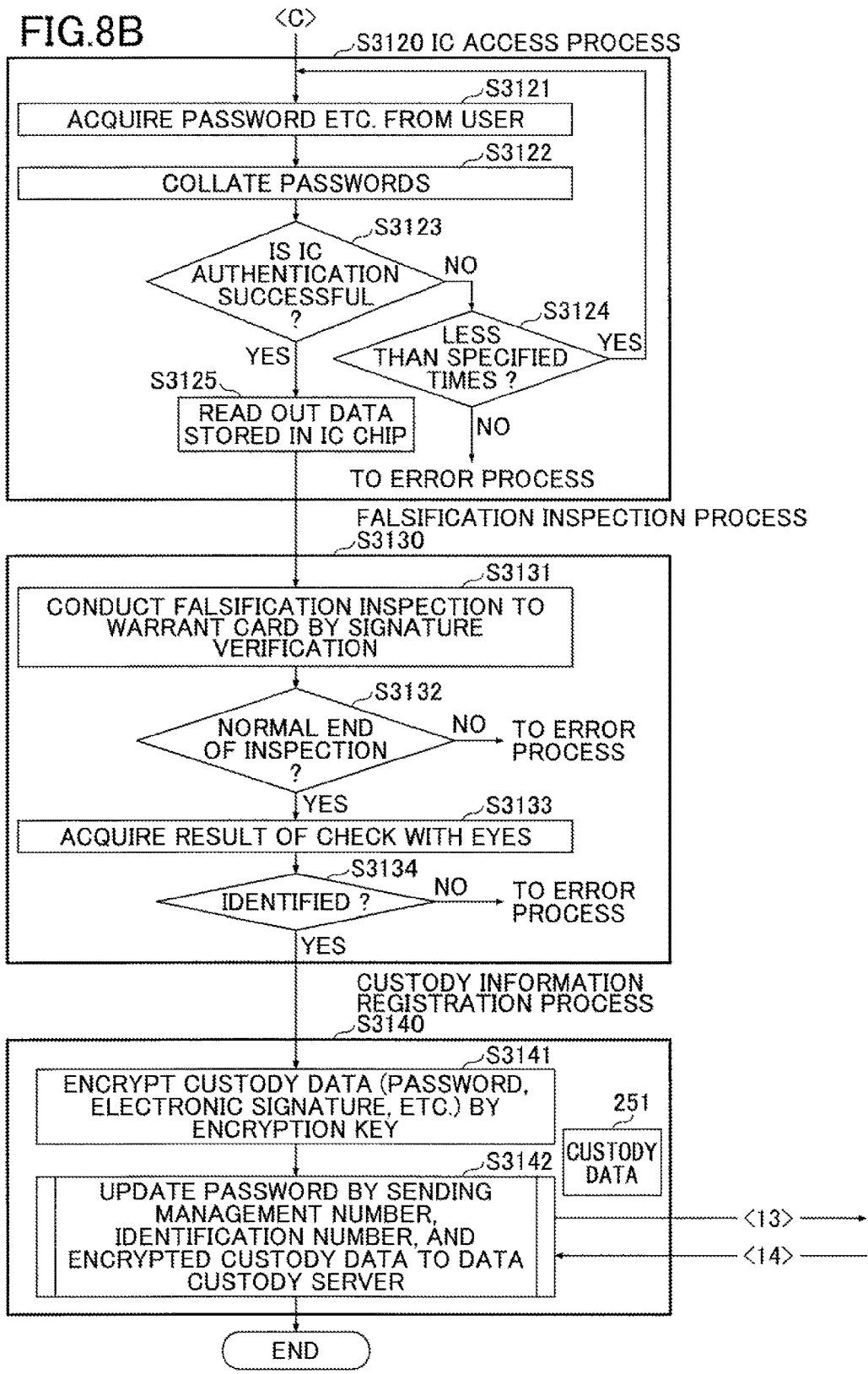
Figure 8C:
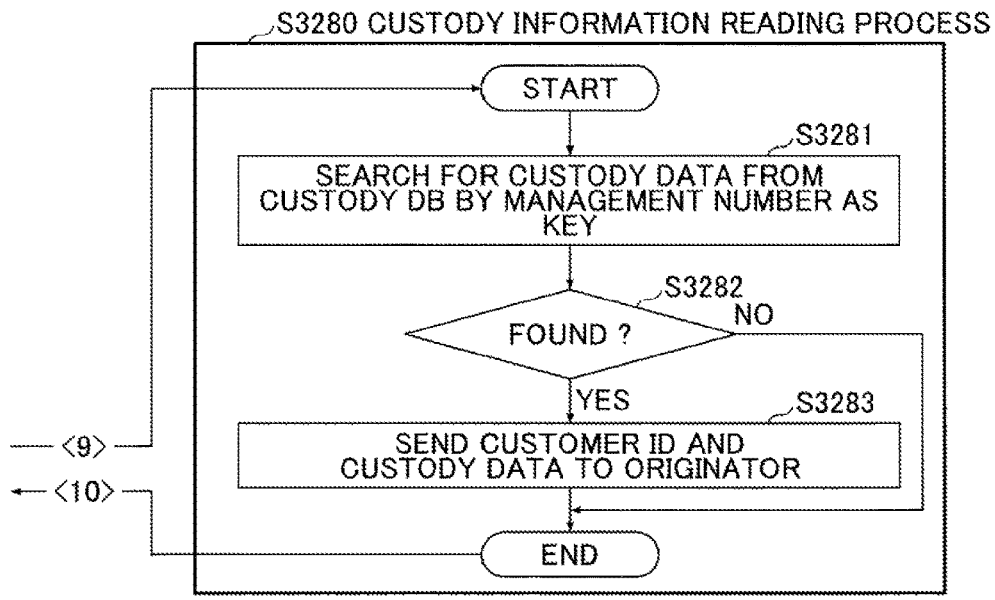

When the custody information reference part 77 sends the management number to the data custody server 200 in step S3171, the data custody server 200 conducts the custody information reading process by the custody information reference part 77 (step S3280 in FIG. 8C). In step S3280, the custody information reading process is conducted as described below.

Referring to FIG. 8C, the custody information reference part 77 searches for the custody data 251 from the custody DB 250 by using the management number received from the client terminal 100 as the key (step S3281). The custody information reference part 77 determines whether the custody data 251 corresponding to the management number exists (step S3282). When the custody data 251 does not exist (NO of step S3282), the custody information reference part 77 terminates the custody information reading process.

When the custody data 251 exists (YES of step S3282), the custody information reference part 77 sends the customer ID and the custody data 251 to the client terminal 100 being the originator of the requests (step S3283). After that, the custody information reading part 78 terminates the custody information reading process.

Figure 8D:
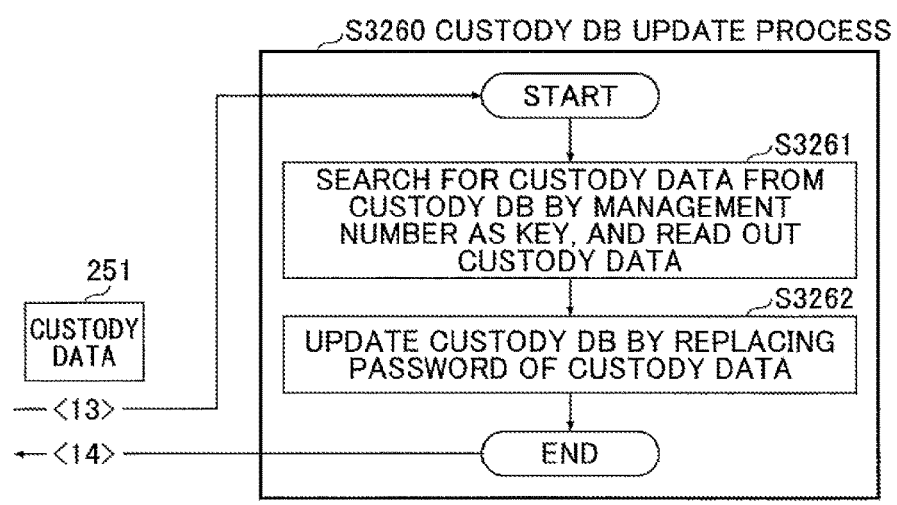
Figure 8E:
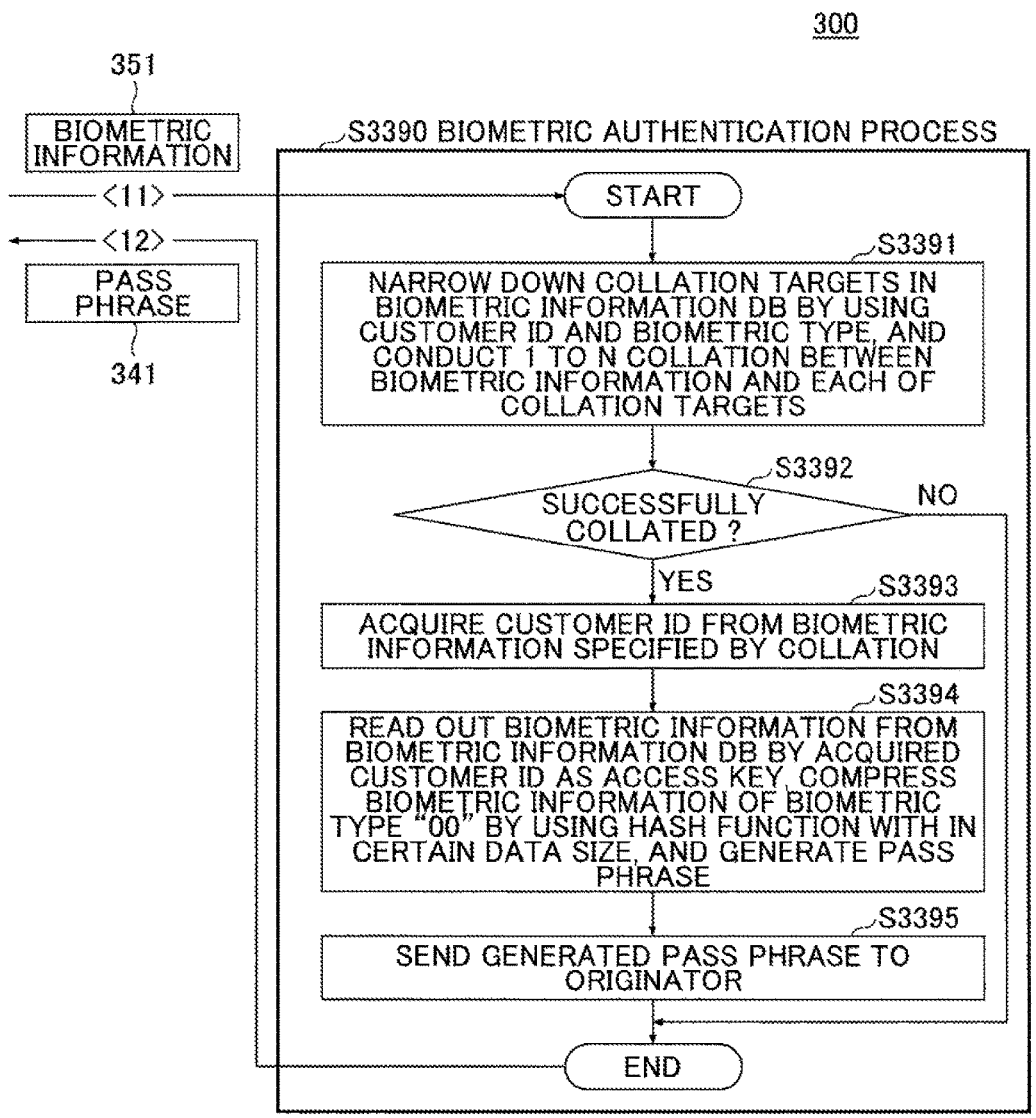

When the custody information reference part 77 sends the biometric information 351 to the biometric authentication server 300 in step S3173, the biometric authentication part 79 conducts the biometric authentication process in the biometric authentication server 300 (step S3390 in FIG. 8E). In step S3390, the biometric authentication process is conducted as described below.

Referring to FIG. 8E, the biometric authentication part 79 narrows collation targets in the biometric information DB 350 by using the customer ID and the biometric type received from the client terminal 100, and conducts the one to many (1:N) collation in which the received biometric information 351 is matched with each of the collation targets (step S3391).

The biometric authentication part 79 determines whether the 1:N collation is successful (step S3392). When the 1:N collation fails (NO of step S3392), that is, when there is no collation target matched with the biometric information 351 of the user 1*u*, the biometric authentication part 79 stops the biometric authentication process. The biometric authentication error is reported to the client terminal 100.

When the 1:N collation is successful (YES of step S3392), that is, when there is the collation target matching with the biometric information 351 of the user 1*u*, the biometric authentication part 79 acquires the customer ID from the matched collation target (step S3393).

After that, the biometric authentication part 79 reads out the biometric information 351 from the biometric information DB 350 by the acquired customer ID as the access key, compresses the biometric information 351 of the biometric information "00" by using the hash function into the size of the certain length, and generates the pass phrase 341 (step S3394). The biometric information 351 may be compressed to 256 bits.

After compressing the biometric information 351, the biometric authentication part 79 sends the generated pass phrase 341 to the client terminal 100 of the originator (step 3395), and terminates the biometric authentication process.

Referring to FIG. 8B, when the custody data 251 are decrypted by the custody information reference conducted by the custody information reference part 77 in step S3170 at the client terminal 100, the IC access part 72 conducts the IC access process (step S3120). In step S3120, the IC access process is conducted as described below.

The IC access part 72 acquires the password and the like used for the IC authentication from the user 1*u* (step S3121). The IC access part 72 displays a screen to urge the user 1*u* to enter the password used for the IC authentication. The user 1*u* enters the password by using the input device 114.

When the password entered by the user 1*u* using the input device 114 is received, the password entered by the user 1*u* is collated with the password stored in the IC chip of the authentication IC card (step S3122).

The IC access part 72 determines whether the IC authentication is successful (step S3123). When the password entered by the user 1*u* is matched with the password in the IC chip of the authentication IC card 3, the IC authentication is successful.

When the IC authentication fails (NO of step S3123), the IC access part 72 repeats the entry of the password and the IC authentication until the entry times reach specified times or the cancel operation is conducted by the user 1*u* (step S3124). In a case in which the IC authentication is canceled or is not performed due to the specified times, or in a case in which the error occurs when the IC chip of the authentication IC card 3 is read, the IC access part 72 displays the message on the display device 115 and stops the IC access process. In this case, the user 1*u* follows the instruction of the operator such as the person in charge at the counter.

When the IC authentication is successful (YES of step S3123), the IC access part 72 reads the data from the IC chip of the authentication IC card 3, stores the identification information and the electronic signature in the temporary storage area in the storage part 130 (step S3125), and terminates the IC access process.

After that, the falsification inspection part 73 conducts the falsification inspection process (step S3130). In step S3130, the falsification inspection process is conducted as described below.

The falsification inspection part 73 conducts the falsification inspection described above by using the identification information and the electronic signature read from the IC chip of the authentication IC card 3, and displays the falsification inspection result on the display device 115 (step S3131).

The falsification inspection part 73 determines whether the falsification inspection result indicates a normal end (step S3132). When the falsification inspection result does not indicate the normal end (NO of step S3132), that is, when the authentication IC card 3 may be falsified, the falsification inspection part 73 displays the message on the display device 115 and stops the falsification inspection process. In this case, the user 1*u* follows the instruction of the operator such as the person in charge at the counter.

When the falsification inspection result indicates the normal end (YES of step S3132), the falsification inspection part 73 acquires the face picture from the identification information stored by the IC access part 72 in the temporary area, and displays it on the display device 115 for the operator (the person in charge at the counter) to check between the face picture and the face of the user 1*u* by eyes and to input the eye check result (step S3133).

The falsification inspection part 73 makes the final decision of the identity confirmation based on the falsification inspection and the eye confirmation result (step S3134). When the falsification inspection normally ends and the eye confirmation result indicates that the user 1*u* is identified, the falsification inspection part 73 makes the final decision that the user 1*u* is identified. Even if the falsification inspection normally ends, when it is decided by the eye confirmation that the user 1*u* is not identical (NO of step S3134), the falsification inspection part 73 stops the falsification inspection process. In this case, the user 1*u* follows the instruction of the operator such as the person in charge or the like.

When the final decision is made that the user 1*u* is identified (YES of step S3134), the falsification inspection part 73 may confirm whether the user 1*u* desires to use the custody service for the password or the like. When the user 1*u* does not use the custody service, it is determined that the user 1*u* maintains the confidential information such as the password or the like. Then, the new registration process is terminated. On the other hand, when the user 1*u* agrees to user the custody service, the following process is further conducted.

The custody information registration process is performed by the custody information registration part 74 (step S3140). In step S3140, a custody information update process is conducted as described below.

The custody information registration part 74 encrypts the custody data 251 by the encryption key generated in step S3175 (step S3141). The custody data 251 includes the password, the electronic signature, and the like.

The custody information registration part 74 sends the management number, the customer ID, the identification number, and the encrypted custody data 251, to the data custody server 200, and updates the custody data 251 of the user 1*u* (step S3142). The password may be updated. The custody information registration part 74 terminates the custody information update process. Also, the update process of the custody data 251 in the system 1000 is terminated.

When the custody information registration part 74 sends the custody data 251 to the data custody server 200 in step S3142, a custody DB update process is conducted by the custody information writing part 76 at the data custody server 200 (step S3260 in FIG. 8D). In step S3260, the custody DB update process is conducted as described below.

Referring to FIG. 8D, when the custody data 251 is received from the client terminal 100, the custody information writing part 76 searches for the custody DB 250 by using the management number as the key, and reads out the custody data 251 of the user 1*u* (step S3261).

The custody information writing part 76 updates the custody DB 250 by rewriting the password of the custody data 251 (step S3262). After the custody data 251 of the user 1*u* in the custody DB 250 is updated, the custody information writing part 76 terminates the custody DB update process.

Next, an addition and re-registration process of the biometric information 351 will be described in the system 1000 in the embodiment. FIG. 9A, FIG. 9B, FIG. 9C, and FIG. 9D are diagrams illustrating a process sequence for explaining the addition and re-registration process in the system in the embodiment.

Figure 9A:
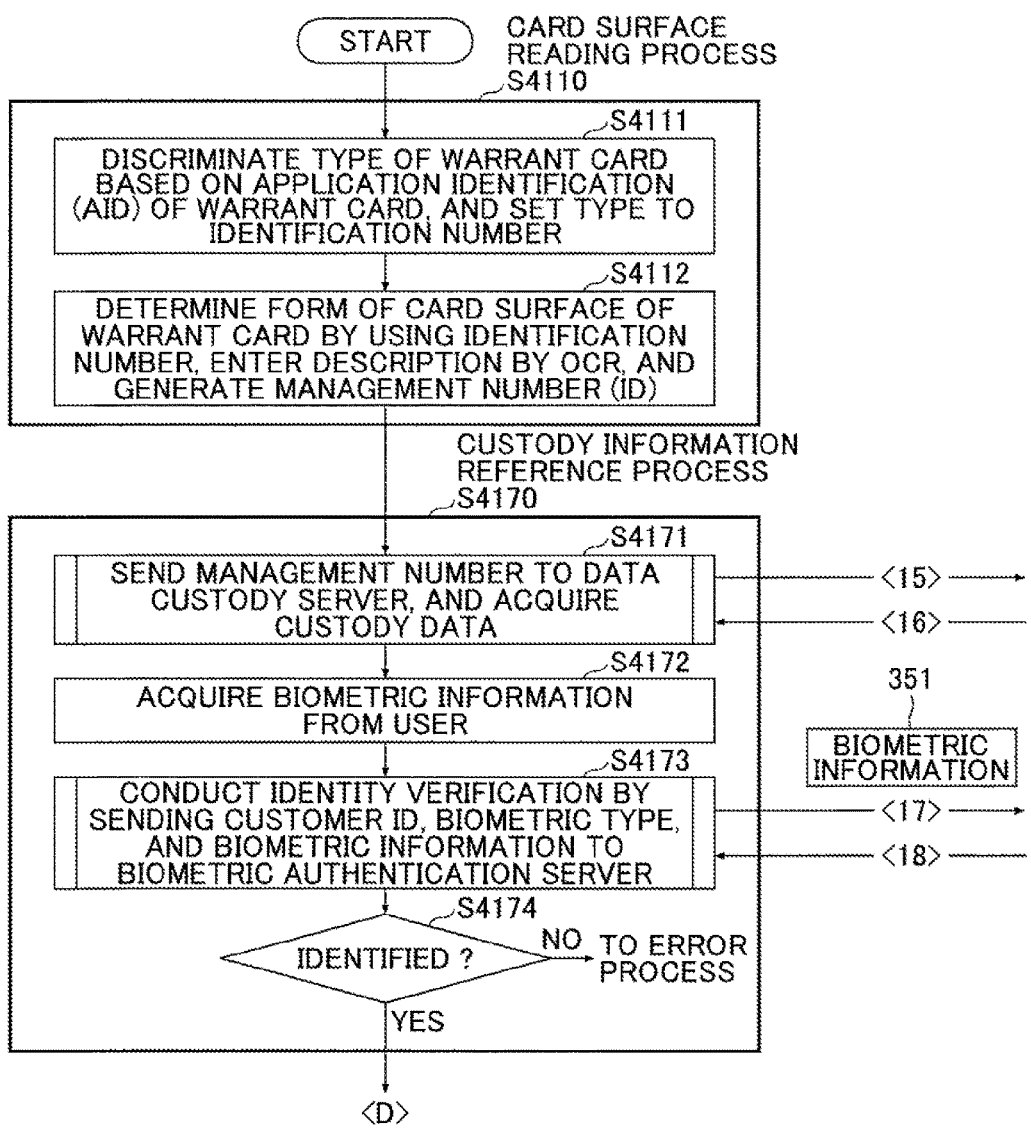
FIG. 9A, FIG. 9B, FIG. 9C, and FIG. 9D are diagrams illustrating a process sequence for explaining an addition and re-registration process in the system.

Referring to FIG. 9A, the card surface reading process is conducted by the card surface reading part 71 at the client terminal 100 (step S4110). In step S4110, the card surface reading part 71 performs the card surface reading process described below.

The card surface reading part 71 discriminates the type by the application identification (AID) of the authentication IC card 3 being the official warrant card, and sets the discriminated type as the identification number (step S4111).

After that, the card surface reading part 71 determines the format of the surface of the authentication IC card 3 by using the identification number, performs the OCR to read the description on the surface, and generates the management number (ID) (step S4112). The process pertinent to the OCR is conducted in the same manner described above. Since the management number is used in a succeeding process, the generated management number is stored in the temporary storage area in the storage part 130. The card surface reading part 71 terminates the card surface reading process.

Next, the custody information reference part 77 conducts a custody information reference process (step S4170). In step S4170, the custody information reference process is conducted as described below.

The custody information reference part 77 sends the management number to the data custody server 200, and acquires the customer ID and the custody data 251 (step S4171). When the custody data 251 is not acquired from the data custody server 200, the custody information reference part 77 stops the custody information reference process, and terminates the reference process of the custody data 251 in the system 1000.

When the custody data 251 are acquired from the data custody server 200, the custody information reference part 77 acquires the biometric information 351 from the user 1*u* (step S4172).

The custody information reference part 77 conducts the identity confirmation by the biometric authentication by sending the customer ID, the biometric type, and the biometric information 351 to the biometric authentication server 300 (step S4173). The custody information reference part 77 determines based on the collation result of the biometric authentication whether the user 1*u* is identified (step S4174). When the biometric authentication error is reported (NO of the step S4174), the custody information reference part 77 stops the custody information reference. Also, the reference process of the custody data 251 is terminated in the system 1000. Alternatively, it may be determined that the biometric authentication is not properly conducted. The custody information reference part 77 may go back to step S4172, acquire again the biometric information 351 from the user 1u, and repeat the above described processes. That is, the biometric authentication may be retried. Also, the custody information reference part 77 urges the operator (the person in charge at the counter) to check between the face picture and the face of the user 1u by eyes. When the user 1u is identified, the custody information reference process may be continued. When the biometric authentication is successful (YES of step S4174), the custody information reference part 77 stores the customer ID in the temporary storage area in the storage part 130, and terminates the custody information reference process.

Figure 9B:
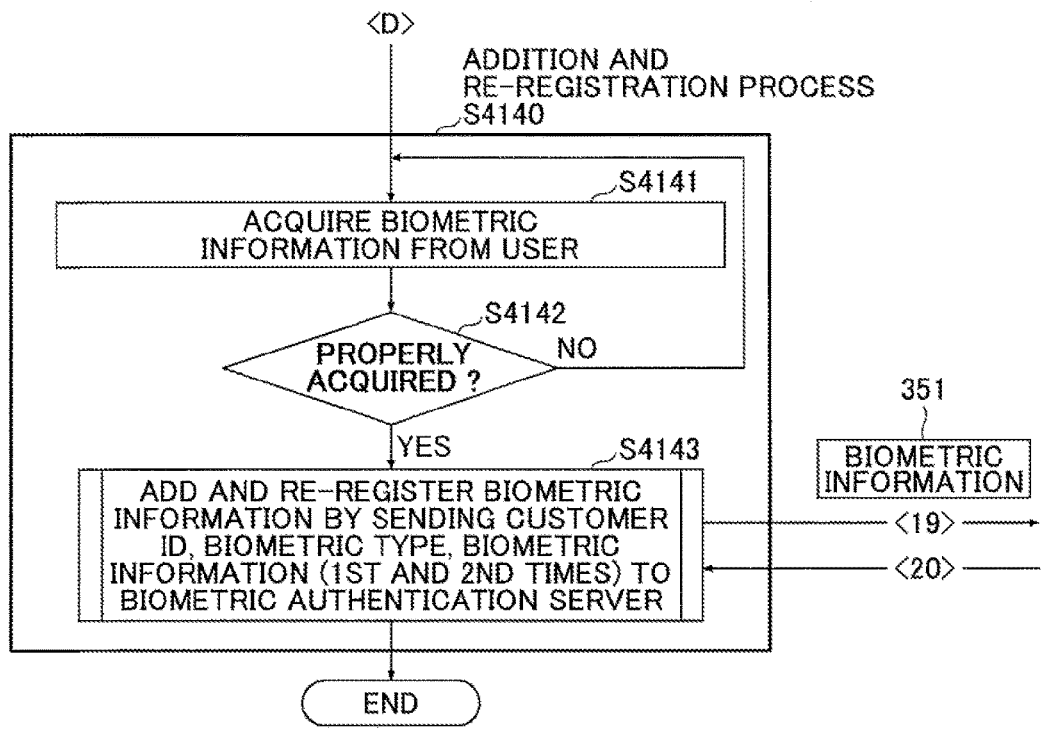
Figure 9C:
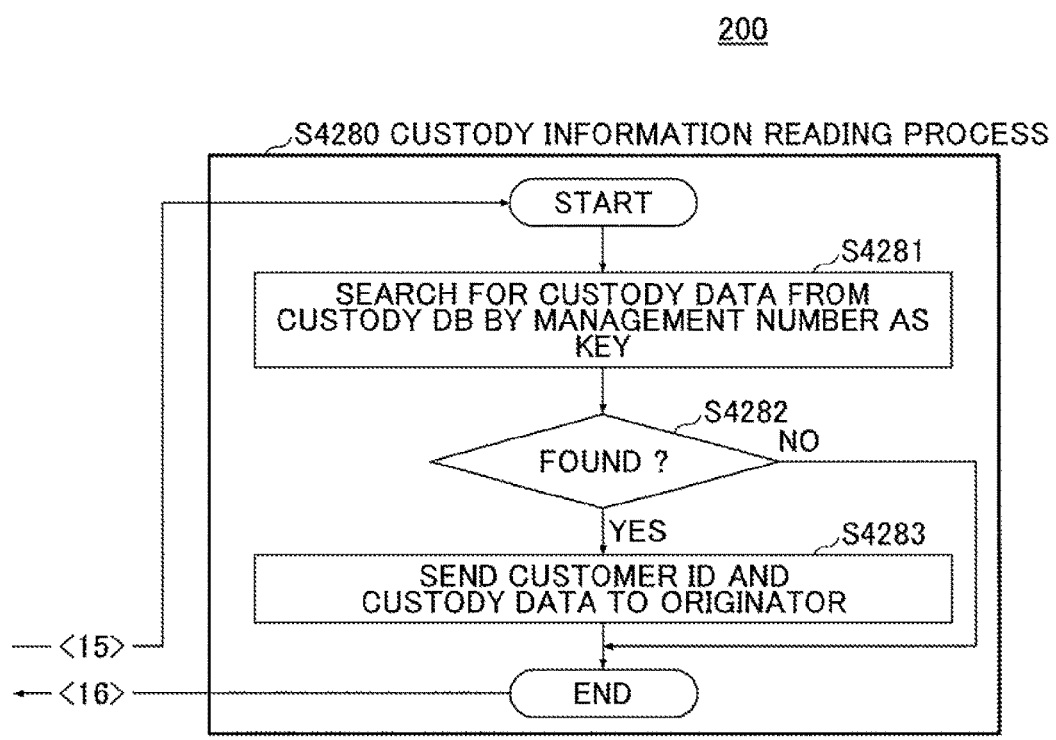

When the custody information reference part 77 sends the management number to the data custody server 200 in step S4174, the custody information reading process is conducted by the custody information reading part 78 at the data custody server 200 (step S4280 in FIG. 9C). In step S4280, the custody information reading process is conducted as described below.

Referring to FIG. 9C, the custody information reading part 78 searches for the custody data 251 from the custody DB 250 by using the management number received from the client terminal 100 as the key (step S4281). The custody information reference part 77 determines whether the custody data 251 corresponding to the management number exists (step S4282). When the custody data 251 does not exist (NO of step S4282), the custody information reading part 78 terminates the custody information reading process.

When the custody data 251 exists (YES of step S4282), the custody information reading part 78 sends the customer ID and the custody data 251 to the client terminal 100 of the originator (step S4283). After that, the custody information reading part 78 terminates the custody information reading process.

Figure 9D:
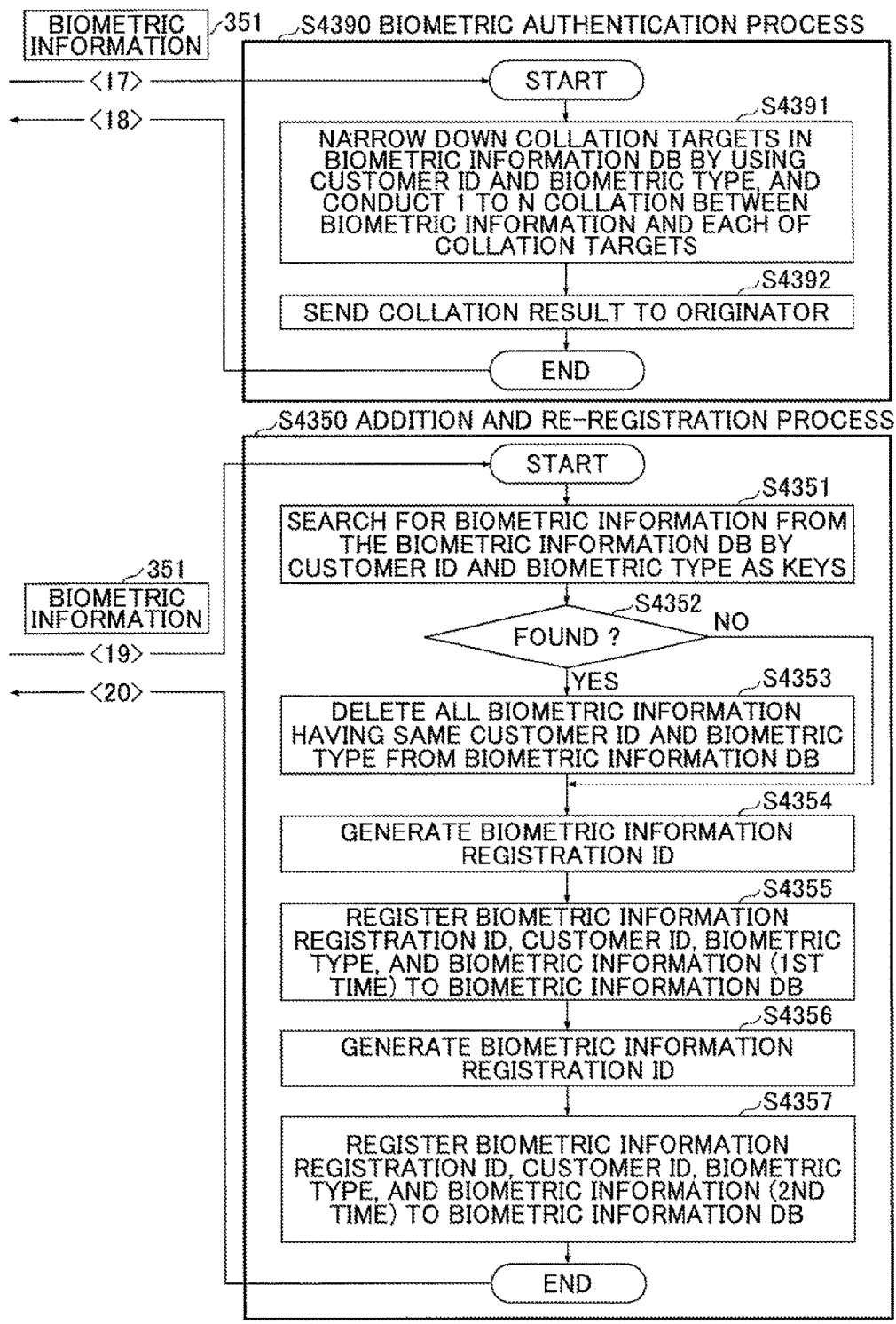

When the custody information reference part 77 sends the biometric information 351 to the biometric authentication server 300 in step S4143 in FIG. 9A, the biometric authentication process is conducted by the biometric authentication part 79 at the biometric authentication server 300 (step S4390 in FIG. 9D). In step S4390, the biometric authentication process is conducted as described below.

Referring to FIG. 9D, the authentication part 79 narrows the collation targets in the biometric information DB 350 by using the customer ID and the biometric type received from the client terminal 100, and conducts the one to many (1:N) collation in which the received biometric information 351 is matched with each of the collation targets (step S4391).

The authentication part 79 sends the collation result to the client terminal 100 of the original (step S4392), and terminates the biometric authentication process.

Referring to FIG. 9B, the addition and re-registration process of the biometric information 351 is conducted by the custody information registration part 74 at the client terminal 100 (step S4140). In step S4140, the addition and re-registration process is conducted by the custody information registration part 74 as described below.

The custody information registration part 74 acquires the biometric information 351 from the user 1u (step S4141). By receiving the biometric information 351 input by the user 1u from the biometric information reader 6, the biometric information 351 of the user 1u is acquired. In order to level the authentication accuracy at the biometric authentication, the biometric information 351 is input by the user 1u several times. Multiple sets of the biometric information 351 are acquired, and are collated with each other, so as to secure an identity of the user 1u and the authentication accuracy. In the embodiment, the biometric information 351 is input three times. A collation between the first biometric information 351 and the second biometric information 351, a collation between the second biometric information 351 and the third biometric information 351 are conducted, so as to secure the identity of the multiple sets of the acquired biometric information 351 and the authentication accuracy.

The custody information registration part 74 determines whether the biometric information 351 is properly acquired (step S4142). When the biometric information 351 is not properly acquired (NO of step S4142), the custody information registration part 74 goes back to step S4141, and further acquires the biometric information 351 from the user 1u.

On the other hand, when the biometric information 351 is properly acquired (YES of step S4142), the custody information registration part 74 sends the biometric type and the biometric information 351 to the biometric authentication server 300, and adds or re-registers the biometric information 351 (step S4143). In the embodiment, the custody information registration part 74 sends the first biometric information 351 and the second biometric information 351 to the biometric authentication server 300, among the first, the second, and the third biometric information 351.

After sending the biometric information 351, the custody information registration part 74 terminates the addition and re-registration process of the biometric information 351. Also, the addition and re-registration process of the biometric information 351 in the system 1000 is terminated.

When the custody information registration part 74 sends the biometric information 351 to the biometric authentication server 300 in step S4143, the addition and re-registration process of the biometric information 351 is conducted by the biometric information registration part 75 at the biometric authentication server 300 (step S4350 in FIG. 9D).

Referring to FIG. 9D, the biometric information registration part 75 searches for the biometric information DB 350 by using the customer ID and the biometric type received from the client terminal 100 (step S4351), and determines whether the biometric information 351 corresponding to the customer ID and the biometric type exists (step S4352). When there is no biometric information (NO of step S4352), the biometric information registration part 75 advances to step S4354 in order to additionally register the received biometric information 351. When the biometric information 351 exists (YES of step S4352), the biometric information registration part 75 deletes the biometric information 351 from the biometric information DB 350, which corresponds to the customer ID and the biometric type, in order to re-register the received biometric information 351 (step S4353). During the deletion, the search is not conducted for the biometric information 351 of the biometric type having the fixed value "00".

The biometric information registration part 75 generates the biometric information registration ID (step S4354). The biometric information registration part 75 registers the generated biometric information registration ID, the received customer ID and biometric type, and the first biometric information 351 in the biometric information DB 350 (step S4355).

Furthermore, the biometric information registration part 75 generates the biometric information registration ID (step S4356). The biometric information registration part 75 registers the generated biometric information registration ID, the received customer ID and biometric type, and the second biometric information 351 in the biometric information DB 350 (step S4357). The biometric information registration part 75 terminates the addition and re-registration process of the biometric information 351.

In the re-registration process of the biometric information 351, the pass phrase 341 is not changed, and the pass phrase initially registered is continuously used.

Also, even if the biometric information 351 is additionally registered, the pass phrase 341 is changed. The pass phrase 341 initially registered is continuously used. That is, for a case in which the biometric type is the same as that initially registered and a case in which the biometric type is different from that initially registered, the pass phrase 341 initially registered is provided to the client terminal 100 after the biometric authentication.

As described above, the biometric information 351, which is used to generate the pass phrase 341 defined when the biometric information 351 is initially registered, is retained without being deleted when the biometric information 351 is re-registered or additionally registered.

That is, even in a case in which the biometric authentication is conducted after the biometric information 351 is re-registered or additionally registered, the pass phrase 341 is always generated from the same biometric information 351 since the biometric information 351 was initially registered.

Accordingly, in the embodiment, after the biometric information 351 is initially registered, is re-registered, or is additionally registered, independent of the dispersion of the biometric information 351, it is possible for the client terminal 100 to decrypt the custody data 251 by using the pass phrase 341.

In Japan, looking ahead to 2020 Olympics and Paralympics in Tokyo, in a creation strategy, a so-called "The safest Japan all over the world", which was decided by the Cabinet on Dec. 10, 2013, in order to ensure a traceability after a cybercrime and to take countermeasures for a special fraud, it is desired to further strengthen the identity confirmation at the counter where the identity confirmation is conducted. Also, similar measurements are desired in the Criminal Proceeds Transfer Prevention Act. In order to ensure the identity confirmation, it is inevitable to secure the authenticity of the official identification, which proves the identity of a person. Hence, it is a concern that opportunities of conducting the falsification inspection of the official identification will be increased.

In this circumstance, by applying the embodiment, it is possible to realize high convenience with respect to an inspector and an inspected person in addition to conducting a high verification of the official identification.

First, it is possible to safely and securely store and maintain important personal information due to use of the biometric information 351.

In the embodiment, it is possible to generate the encryption key by using the biometric information 351 and to safely and securely store and maintain the important personal information such as the password and the like.

It is possible to realize a security measurement higher than before, by a strict identity authentication using the biometric authentication in order to acquire information such as the registered password or the like.

Also, in the embodiment, the encryption key is generated by using the biometric information 351 of the person (the user 1*u*) possessing the warrant card. Hence, it is possible to encrypt and decrypt the custody data 251 of the password and the like, which are registered in the custody DB 250 of the data custody server 200, independent of the memory of the user 1*u* regarding the password or the like to generate the encryption key. It is possible to realize a safe and secure storage and maintenance of the custody data 251.

The encryption key is different for each of the persons possessing their own warrant card. It is possible to minimize an influence with respect to an information leakage at a chance in a million.

Second, in a case of registration of the password, by using the pass phrase 341 generated by using the biometric information 351, randomness of the pass phrase 341 is improved. Hence, it is possible to automatically generate the encryption key and the password having stronger security.

Third, by safely and securely maintaining the information of the password and the like, which are counting on a person's memory, by the custody service, when the user 1*u* uses the custody service at a second time, the user 1*u* may not enter the password and the like. It is possible to realize a measurement for an obliviousness of the password.

Fourth, it is possible to realize effectiveness of a signature and certificate verification process by collating with the verified electronic signature. Also, in a case of the personal number card 3*c*, it is possible to reduce a commission pertinent to the validity verification of the personal number card 3*c*.

Fifth, on the assumption on that the authenticity determination of the warrant card and the identity confirmation (check of the face picture by eyes) are conducted with precision, from a second time, it is possible to conduct a strict identity authentication by the biometric authentication utilizing the biometric information 351 registered in the custody DB 250. It is possible to omit the check by eyes between the face picture of the user 1*u* and the face of the user 1*u*. Hence, it is possible to economize on manpower and improve the accuracy of the identity confirmation.

An embodiment described below will provide a technology for realizing consistency of the biometric information used to acquire the confidential information and storing the confidential information pertinent to the IC authentication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A confidential information storing method performed by a computer, comprising:
   acquiring multiple sets of biometric information from a biometric information reader;
   storing the multiple sets of the acquired biometric information and specific information for specifying the biometric information to be used to generate a pass phrase in a biometric information storage part;
   acquiring the pass phrase generated based on the biometric information and the specific information;

encrypting confidential information by using the acquired pass phrase; and storing the encrypted confidential information.

2. The confidential information storing method according to claim 1, further comprising:

acquiring the biometric information from the biometric information reader;

acquiring the confidential information from the confidential information storage part;

collating the acquired biometric information with each of the multiple sets of the biometric information stored in the confidential information storage part;

acquiring the pass phrase generated by using the biometric information specified by the specific information among sets of the collated biometric information; and conducting a process for decrypting the confidential information by using the acquired pass phrase.

3. The confidential information storing method according to claim 1, wherein the specific information corresponds to a user identifier for identifying a user associated with the biometric information, in which one of respective registration IDs is applied to the multiple sets of the acquired biometric information, the method further comprising:

acquiring the user identifier with the pass phrase;

encrypting the confidential information by using the pass phrase; and storing the encrypted confidential information in the confidential information storage part by associating with a card identifier for identifying an IC card, from which the confidential information is acquired, and the acquired user identifier.

4. The confidential information storing method according to claim 3, further comprising:

acquiring the card identifier for identifying the IC card;

acquiring the confidential information and the user identifier from the confidential information storage part by using the card identifier;

acquiring the biometric information from the biometric information reader;

conducting a collation with the multiple sets of the biometric information stored in the biometric information storage part by using the acquired user identifier and the acquired biometric information;

acquiring the pass phrase generated by using the biometric information specified by the specific information from among sets of the collated biometric information; and decrypting the confidential information by using the acquired pass phrase.

5. The confidential information storing method according to claim 1, wherein the biometric information used to generate the pass phrase is stored in the biometric information storage part by associating with the specific information;

each of the multiple sets of the acquired biometric information is stored in the biometric information storage part with a biometric type for specifying a body part pertinent to the multiple sets of the acquired biometric information; and the pass phrase is generated by compressing the biometric information specified by the specific information in the biometric information storage part.

6. The confidential information storing method according to claim 4, further comprising:

receiving information read from a surface of the IC card by the card reader; and generating the card identifier for identifying the IC card by using the read information.

7. The confidential information storing method according to claim 4, further comprising:

replacing the confidential information stored in the confidential information storage part with changed confidential information when the acquired biometric information is collated and when the confidential information is collated.

8. The confidential information storing method according to claim 4, further comprising:

receiving multiple sets of first biometric information of a person;

deleting second biometric information associated with the user identifier of the person from the biometric information storage part; and storing the multiple sets of the received first biometric information by being associated with the user identifier in the biometric information storage part.

9. The confidential information storing method according to claim 4, further comprising:

receiving multiple sets of first biometric information of a person;

adding the multiple sets of the received first biometric information by associating with the user identifier of the person in the biometric information storage part, in which second biometric information has been associated with a same user identifier and stored.

10. An information processing terminal, comprising:

a memory; and a processor coupled to the memory and the processor configured to acquire multiple sets of biometric information from a biometric information reader;

store the multiple sets of the acquired biometric information and specific information for specifying the biometric information used to generate a pass phrase;

acquire the pass phrase generated based on the biometric information and the specific information;

encrypt confidential information by using the acquired pass phrase; and store the encrypted confidential information in a confidential information storage part.

11. A non-transitory computer-readable recording medium storing a confidential information storing program that causes a computer to perform a process comprising:

acquiring multiple sets of biometric information from a biometric information reader;

storing the multiple sets of the acquired biometric information and specific information for specifying the biometric information used to generate a pass phrase;

acquiring the pass phrase generated based on the biometric information and the specific information;

encrypting confidential information by using the acquired pass phrase; and storing the encrypted confidential information in a confidential information storage part.

* * * * *